United States Patent
Oda et al.

(10) Patent No.: US 10,868,310 B2
(45) Date of Patent: Dec. 15, 2020

(54) NEGATIVE ELECTRODE CURRENT COLLECTOR FOIL INCLUDING IRON BASED ALLOY LAYER SANDWICHED BETWEEN COPPER LAYERS AND METHOD FOR MANUFACTURING THE SAME

(71) Applicant: HITACHI METALS, LTD., Tokyo (JP)

(72) Inventors: Yoshimitsu Oda, Suita (JP); Ryoji Inoue, Suita (JP); Wataru Kushima, Suita (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/336,558

(22) PCT Filed: Feb. 28, 2018

(86) PCT No.: PCT/JP2018/007520
§ 371 (c)(1),
(2) Date: Mar. 26, 2019

(87) PCT Pub. No.: WO2018/168468
PCT Pub. Date: Sep. 20, 2018

(65) Prior Publication Data
US 2019/0363367 A1    Nov. 28, 2019

(30) Foreign Application Priority Data

Mar. 17, 2017   (JP) .................................. 2017-052373

(51) Int. Cl.
*H01M 4/66* (2006.01)
*C21D 6/00* (2006.01)
(Continued)

(52) U.S. Cl.
CPC ............ *H01M 4/667* (2013.01); *C21D 6/004* (2013.01); *C21D 9/46* (2013.01); *C22C 9/00* (2013.01);
(Continued)

(58) Field of Classification Search
CPC .... H01M 4/667; H01M 4/6691; H01M 4/669; C21D 6/004; C21D 9/46; C22C 9/00;
(Continued)

(56) References Cited

U.S. PATENT DOCUMENTS 2,249,417 A * 7/1941 Chace ................... B32B 15/015
428/677
9,017,877 B2    4/2015 Sato et al.
(Continued)

FOREIGN PATENT DOCUMENTS

CN    106104876 A    11/2016
JP    63-179023 A    7/1988
(Continued)

OTHER PUBLICATIONS

International Search Report dated May 22, 2018, issued in counterpart application No. PCT/JP2018/007520, w/English translation (3 pages).
(Continued)

*Primary Examiner* — Sean P Cullen
(74) *Attorney, Agent, or Firm* — Westerman, Hattori, Daniels & Adrian, LLP

(57) ABSTRACT

A foil (5*b*) for a negative electrode collector of a secondary battery includes a Cu-coated foil (50) including an iron-based alloy layer (51) made of precipitation hardened stainless steel, and a pair of Cu layers (52, 53) respectively disposed on opposite surfaces of the iron-based alloy layer and made of Cu or a Cu-based alloy. The negative electrode
(Continued)

collector foil has a thickness of 20 μm or less and a volume resistivity of 7 μΩ·cm or less.

8 Claims, 7 Drawing Sheets

(51) Int. Cl.
    *C21D 9/46*     (2006.01)
    *C22C 9/00*     (2006.01)
    *C22C 38/00*     (2006.01)
    *C22C 38/06*     (2006.01)
    *C22C 38/40*     (2006.01)
    *C22F 1/08*     (2006.01)
    *C23C 30/00*     (2006.01)
    *H01M 4/02*     (2006.01)

(52) U.S. Cl.
    CPC ............ *C22C 38/001* (2013.01); *C22C 38/06* (2013.01); *C22C 38/40* (2013.01); *C22F 1/08* (2013.01); *C23C 30/00* (2013.01); *H01M 4/661* (2013.01); *H01M 4/669* (2013.01); *H01M 2004/027* (2013.01)

(58) Field of Classification Search
    CPC ....... C22C 38/001; C22C 38/06; C22C 38/40; C22F 1/08; C23C 30/00
    USPC .......................................................... 429/245
    See application file for complete search history.

(56) References Cited

U.S. PATENT DOCUMENTS

| | | | |
|---|---|---|---|
| 9,368,799 B2 | 6/2016 | Majima et al. | |
| 9,692,057 B2 | 6/2017 | Majima et al. | |
| 2013/0130119 A1* | 5/2013 | Majima | B23K 20/04 429/231.8 |
| 2015/0037684 A1* | 2/2015 | Ishizuka | C25D 5/36 429/245 |
| 2015/0325852 A1* | 11/2015 | Wang | H01M 4/366 429/231.95 |
| 2017/0141404 A1 | 5/2017 | Song et al. | |
| 2019/0047254 A1 | 2/2019 | Yamamoto | |
| 2019/0047256 A1 | 2/2019 | Yamamoto | |

FOREIGN PATENT DOCUMENTS

| | | | |
|---|---|---|---|
| JP | 05062685 A | * | 3/1993 |
| JP | 2008-123964 A | | 5/2008 |
| JP | 2008123964 A | * | 5/2008 |
| JP | 5217596 B2 | | 6/2013 |
| JP | 2013114825 A | * | 6/2013 |
| JP | 5329290 B2 | | 10/2013 |
| JP | 5726216 B2 | | 5/2015 |
| JP | 5726217 B2 | | 5/2015 |
| JP | 5726218 B2 | | 5/2015 |
| JP | 6237950 B1 | | 11/2017 |

OTHER PUBLICATIONS

Written Opinion dated May 22, 2018, issued in counterpart application No. PCT/JP2018/007520 (3 pages).
Decision to Grant a Patent dated Jul. 31, 2018, issued in counterpart Japanese Patent Application No. 2018-528363, w/English translation (6 pages).
Extended Search Report dated May 15, 2019, issued in counterpart EP Application No. 18768692.8 (8 pages).
Office Action dated Sep. 11, 2019, issued in counterpart CN Application No. 201880003696.X, with English translation. (13 pages).

* cited by examiner

BEFORE AGING TREATMENT (TEST MATERIAL 6a)

AFTER AGING TREATMENT (TEST MATERIAL 6e)

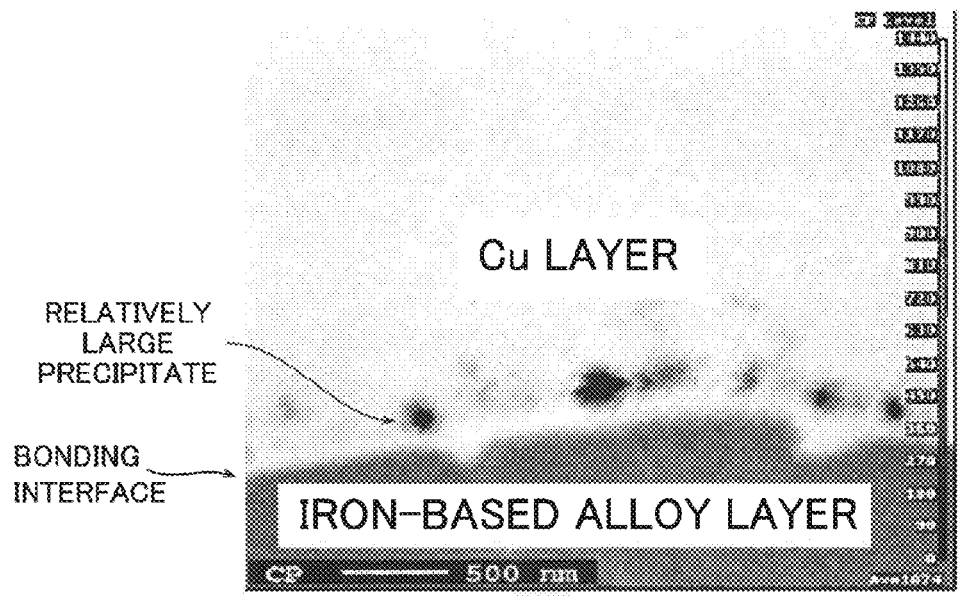
FIG.10 SEM PHOTOGRAPH OF PRECIPITATE OF TEST MATERIAL 6e
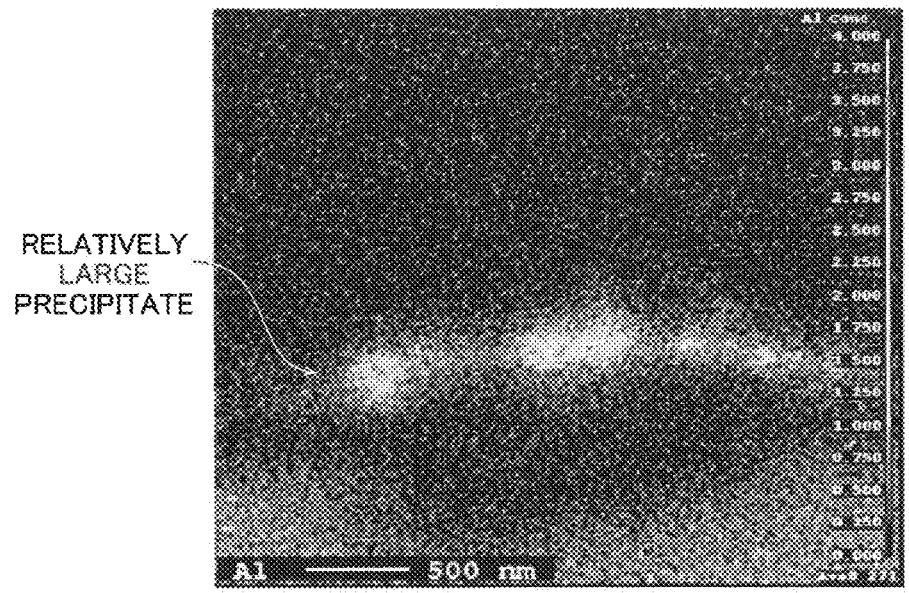
FIG.11 EPMA PHOTOGRAPH OF PRECIPITATE OF TEST MATERIAL 6e

NEGATIVE ELECTRODE CURRENT COLLECTOR FOIL INCLUDING IRON BASED ALLOY LAYER SANDWICHED BETWEEN COPPER LAYERS AND METHOD FOR MANUFACTURING THE SAME

TECHNICAL FIELD

The present invention relates to a foil for a negative electrode collector of a secondary battery and a method for manufacturing the same.

BACKGROUND ART

In recent years, in a lithium-ion secondary battery, which is a secondary battery having a high battery capacity, a negative electrode active material that can further increase the amount of Li (lithium) that can be inserted and desorbed tends to be used in order to further improve the battery capacity, and a foil with a small thickness of 20 µm or less tends to be used as a negative electrode collector having a surface on which the negative electrode active material is disposed. However, due to expansion and contraction of the negative electrode active material caused by insertion and desorption of Li, a large stress caused by large fluctuations in the volume of the negative electrode active material repeatedly acts on the foil for the negative electrode collector of the secondary battery having the surface on which the negative electrode active material is disposed. Therefore, improvement of the mechanical strength of the foil for the negative electrode collector of the secondary battery is required in order to withstand the large stress. Therefore, in general, a foil for a negative electrode collector of a secondary battery with improved mechanical strength is known. Such a foil for a negative electrode collector of a secondary battery with improved mechanical strength is disclosed in Japanese Patent No. 5329290, for example.

Japanese Patent No. 5329290 discloses a clad material for a negative electrode collector used as a material for a negative electrode collector of a lithium-ion secondary battery and having a three-layer structure with a thickness of 20 µm or less, in which copper layers (Cu layers) are bonded onto opposite surfaces of a nickel-based metal layer made of nickel-based metal. The tensile strength of the clad material for the negative electrode collector having a three-layer structure described in Japanese Patent No. 5329290 is increased to about 770 MPa to 930 MPa by adopting a NiNb alloy as the nickel-based metal, and the clad material for the negative electrode collector has a high strength.

In order to further increase the capacity of the secondary battery, the thickness of a negative electrode active material layer such as a Si-based layer is conceivably increased from now on, and thus a stress applied to a foil for the negative electrode collector becomes larger. In this regard, even in the case of the clad material for the negative electrode collector (the foil for the negative electrode collector of the secondary battery) described in Japanese Patent No. 5329290, the foil for the negative electrode collector plastically deforms due to the stress repetitively applied due to expansion and contraction of the negative electrode active material, and it is predicted that and wrinkle-like irregularities are formed on the foil for the negative electrode collector. When such irregularities are formed, disadvantages such as cracks occur in the negative electrode active material layer disposed on the foil for the negative electrode collector.

Therefore, the inventors of the present invention have examined production of a foil for a negative electrode collector of a secondary battery with improved limit of elastic deformation (elastic limit) by using precipitation hardened stainless steel, such as SUS630 and SUS631, that complies with JIS G4305: 2012 and can be expected to have high hardness and high proof stress instead of nickel-based metal. The precipitation hardened stainless steel can improve the elastic limit by forming fine precipitates due to aging treatment according to JIS G4305: 2012. In general, a Cu-coated material using precipitation hardened stainless steel is known although the same does not have a foil shape with a thickness of 20 µm or less. Such a Cu-coated material using precipitation hardened stainless steel is disclosed in Japanese Patent Laid-Open No. 2008-123964, for example.

Japanese Patent Laid-Open No. 2008-123964 discloses a clad material (Cu-coated material) having a laminated structure, formed by integrally bonding Cu or a Cu-based alloy onto opposite surfaces of precipitation hardened stainless steel before aging treatment and then performing heat treatment with a holding time of about 5 minutes to about 180 minutes at a temperature of 400° C. to 700° C. depending on a material, and used for a connector terminal etc. The above heat treatment conditions are conceivably based on general knowledge that as the holding time is longer, the volume resistivity of Cu or a Cu-based alloy becomes smaller. The thickness of the clad material is about 0.1 mm to 1 mm. In Example 1, a clad material formed by sandwiching SUS630 having a thickness of 1 mm from opposite sides with Cu (oxygen-free copper) having a thickness of 0.5 mm, repetitively rolling the cladding having a total thickness of 2 mm to have a thickness of 0.2 mm, and then performing heat treatment with a holding time of 10 minutes at a temperature of 480° C. is disclosed.

PRIOR ART DOCUMENT

Patent Document

Patent Document 1: Japanese Patent No. 5329290
Patent Document 2: Japanese Patent Laid-Open No. 2008-123964

SUMMARY OF THE INVENTION

Problems to be Solved by the Invention

Here, as a result of the inventors' study, it has been found that when the Cu-coated material (clad material) having a large thickness of 0.1 mm or more in a rolled state, which is not annealed, as disclosed in Japanese Patent Laid-Open No. 2008-123964 is shaped into a foil having a thickness of 20 µm or less, having sufficient conductivity, and used as a foil for a negative electrode collector, it is necessary to ensure necessary rolling properties such as sufficient ductility. Specifically, when calculation is performed from the thickness of the Cu-coated material (clad material) after annealing before reaching a thickness of 0.1 mm, it is necessary to control the rolling reduction to about 80% or less in order to form a foil having a thickness of 20 µm or less. Therefore, it is necessary to ensure ductility by performing heat treatment (softening annealing) as appropriate during rolling from a thickness of 0.1 mm to a thickness of 20 µm in order to significantly reduce or prevent breakage of the Cu-coated material during rolling due to the large rolling reduction. However, it has been found that there are problems that when a Cu-coated foil rolled to a thickness of 20 µm is annealed, the volume resistivity of the Cu-coated foil after annealing is increased and the conductivity is decreased.

The present invention has been proposed in order to solve the aforementioned problems, and an object of the present invention is to provide a foil for a negative electrode collector of a secondary battery having a sufficient elastic limit and sufficient conductivity even in the case of a thinner foil having a thickness of 20 μm or less, and a method for manufacturing the same.

Means for Solving the Problems

A foil for a negative electrode collector of a secondary battery according to a first aspect of the present invention includes a Cu-coated foil including an iron-based alloy layer made of precipitation hardened stainless steel, and a pair of Cu layers respectively disposed on opposite surfaces of the iron-based alloy layer and made of Cu or a Cu-based alloy, and the foil for a negative electrode collector of a secondary battery has a thickness of 20 μm or less and a volume resistivity of 7 μΩ·cm or less. As long as the Cu-coated foil has a structure in which the pair of Cu layers made of the Cu or the Cu-based alloy are respectively disposed on the opposite surfaces of the iron-based alloy layer, the Cu layers may be disposed such that in a width direction (short-side direction) of the foil, a very small side surface of the iron-based alloy layer is exposed or is not exposed.

As described above, the foil for a negative electrode collector of a secondary battery according to the first aspect of the present invention has a thickness of 20 μm or less and a volume resistivity of 7 μΩ·cm or less. Although this foil for a negative electrode collector has a thickness of 20 μm or less, which is sufficiently thinner than the thickness (0.1 mm) of the clad material disclosed in Japanese Patent Laid-Open No. 2008-123964, the volume resistivity is 7 μΩ·cm or less, and thus the conductivity of the foil for a negative electrode collector can be set to 24.6% IACS or more. Furthermore, the iron-based alloy layer is made of the precipitation hardened stainless steel such that the elastic limit of the iron-based alloy layer can be improved due to precipitation hardening through aging treatment, and thus the elastic limit of the foil for a negative electrode collector can be improved. Consequently, it is possible to provide the foil for a negative electrode collector of a secondary battery, having a thickness of 20 μm or less and having a sufficient elastic limit and sufficient conductivity. In addition, the elastic limit of the foil for a negative electrode collector is improved such that even when the thickness of a negative electrode active material layer becomes larger and a stress applied to the foil for a negative electrode collector becomes larger, plastic deformation of the foil for a negative electrode collector can be significantly reduced or prevented. Thus, even when a stress is repetitively applied due to expansion and contraction of the negative electrode active material, formation of wrinkle-like irregularities on the foil for a negative electrode collector can be significantly reduced or prevented. Consequently, occurrence of cracks in the negative electrode active material layer disposed on the foil for a negative electrode collector can be significantly reduced or prevented.

Preferably in the aforementioned foil for a negative electrode collector of a secondary battery according to the first aspect, even in the case of a thin thickness of 20 μm or less, the elastic limit stress value (elastic limit stress $\sigma_{0.01}$) is 700 MPa or more. The term "elastic limit stress $\sigma_{0.01}$" indicates a wider concept including not only a stress at which permanent distortion that remains in the foil for a negative electrode collector after unloading in a tensile test becomes 0.01%, but also a stress (tensile strength) at which the foil for a negative electrode collector is broken in a state in which the plastic deformation (permanent distortion) is substantially elastic deformation of less than 0.01%. According to this structure, even when the thickness of the negative electrode active material layer becomes larger and the stress applied to the foil for a negative electrode collector becomes larger, plastic deformation of the foil for a negative electrode collector can be sufficiently significantly reduced or prevented. Thus, even when a stress is repetitively applied due to expansion and contraction of the negative electrode active material during use of the secondary battery, formation of wrinkle-like irregularities on the foil for a negative electrode collector can be sufficiently significantly reduced or prevented. Consequently, occurrence of cracks in the negative electrode active material layer on the foil for a negative electrode collector can be sufficiently significantly reduced or prevented.

Preferably in the aforementioned foil for a negative electrode collector of a secondary battery according to the first aspect, the precipitation hardened stainless steel of which the iron-based alloy layer is made contains 15 mass % or more and 19 mass % or less of Cr (chromium), 6 mass % or more and 9 mass % or less of Ni (nickel), 0.5 mass % or more and 2.0 mass % or less of Al (aluminum), 0.01 mass % or more and 0.3 mass % or less of C (carbon), 0.01 mass % or more and 0.3 mass % or less of N (nitrogen), a balance Fe (iron), and inevitable impurities. According to this structure, due to the aging treatment, fine precipitates of Al and Ni are generated in the structure of the iron-based alloy layer, and anchoring of dislocations caused by C and N occurs. Thus, the elastic limits of the iron-based alloy layer and the foil for a negative electrode collector can be improved.

In the aforementioned foil for a negative electrode collector of a secondary battery according to the first aspect, a metal element that constitutes the precipitation hardened stainless steel may diffuse into the pair of Cu layers, and a portion of the diffused metal element may exist as a precipitate in the pair of Cu layers. The inventors of the present invention have found that even when the metal element that constitutes the precipitation hardened stainless steel diffuses (solid-dissolves) into the Cu layers and the volume resistivities of the Cu layers increase, the aging treatment (short-time aging treatment) is performed in a predetermined temperature range for a shorter holding time instead of the aging treatment for a holding time of about 5 minutes or more disclosed in Japanese Patent Laid-Open No. 2008-123964 when the precipitation hardened stainless steel is used such that the volume resistivities of the Cu layers can be decreased. Therefore, the conductivity of the foil for a negative electrode collector is ensured.

Preferably, the aforementioned foil for a negative electrode collector of a secondary battery according to the first aspect is made of a clad material in which the pair of Cu layers are respectively bonded onto the opposite surfaces of the iron-based alloy layer. According to this structure, it is possible to provide the foil for a negative electrode collector of a second battery, having a thickness of 20 μm or less and having a sufficient elastic limit and sufficient conductivity, in which the iron-based alloy layer is closely bonded to the Cu layers.

Preferably in the aforementioned foil for a negative electrode collector of a secondary battery according to the first aspect, each of the pair of Cu layers is a Cu-plated layer made of the Cu or the Cu-based alloy. According to this structure, it is possible to provide the foil for a negative electrode collector of a second battery, having a thickness of 20 μm or less and having a sufficient elastic limit and sufficient conductivity, in which the Cu layers are closely bonded to the iron-based alloy layer.

In a method for manufacturing a foil for a negative electrode collector of a secondary battery according to a second aspect of the present invention, Cu or a Cu-based alloy is disposed in layers on opposite surfaces of an iron-based alloy plate material made of precipitation hardened stainless steel such that a Cu-coated material including an iron-based alloy layer made of the precipitation hardened stainless steel and a pair of Cu layers respectively disposed on opposite surfaces of the iron-based alloy layer and made of the Cu or the Cu-based alloy, and having a first thickness of more than 20 μm is produced, the produced Cu-coated material is rolled to a second thickness of 20 μm or less, and thereafter aging treatment (short-time aging treatment) is performed at a temperature of 500° C. or higher and 650° C. or lower for a holding time of 0.5 minutes or more and 3 minutes or less such that a Cu-coated foil having a thickness of 20 μm or less and a volume resistivity of 7 μΩ·cm or less is obtained.

In the method for manufacturing a foil for a negative electrode collector of a secondary battery according to the second aspect of the present invention, as described above, the Cu-coated material is rolled to a second thickness of 20 μm or less, and thereafter the aging treatment (short-time aging treatment) is performed at a temperature of 500° C. or higher and 650° C. or lower for a holding time of 0.5 minutes or more and 3 minutes or less. Accordingly, the inventors of the present invention have found that even when the volume resistivity of the Cu-coated material before rolling to a second thickness of 20 μm or less is increased, the aging treatment is performed under the above conditions such that the volume resistivity of the foil for a negative electrode collector can be decreased to 7 μΩ·cm or less. Consequently, similarly to the first aspect, it is possible to provide the foil for a negative electrode collector of a secondary battery, having a thickness of 20 μm or less and having a sufficient elastic limit and sufficient conductivity.

In the method for manufacturing a foil for a negative electrode collector of a secondary battery according to the second aspect, as described above, the holding time is set to 3 minutes or less, and the aging treatment is performed in a shorter time than the conventional time. The holding time of the aging treatment is 0.5 minutes or more and 3 minutes or less, which is shorter than the conventional one such that as compared with the case in which the aging treatment is performed for a holding time of about 5 minutes to about 180 minutes, which is more than 3 minutes, as disclosed in Japanese Patent Laid-Open No. 2008-123964, age hardening due to heating can be performed in a shorter time. Thus, the foil for a negative electrode collector can be produced by a roll-to-roll method using a continuous furnace excellent in mass productivity for the aging treatment. In addition, when the foil for a negative electrode collector is produced using a continuous furnace, an increase in the size of the continuous furnace can be significantly reduced or prevented, and thus an increase in the size of the entire manufacturing apparatus of the foil for a negative electrode collector can be significantly reduced or prevented. When the holding temperature of the aging treatment is lower than 500° C., a holding time of more than 3 minutes is required, and thus it is not easy to produce the foil for a negative electrode collector by the roll-to-roll method using the continuous furnace, and it is disadvantageous when production efficiency is emphasized. If the holding temperature of the aging treatment is set to be higher than 650° C., the foil for a negative electrode collector is excessively softened, and the softening is offset by precipitation hardening. Thus, there is a possibility that the effect of improving the elastic limit cannot be obtained. Therefore, from the viewpoint of production efficiency, in the method for manufacturing a foil for a negative electrode collector of a secondary battery according to the second aspect, as described above, the aging treatment (short-time aging treatment) is preferably performed at a temperature of 500° C. or higher and 650° C. or lower for a holding time of 0.5 minutes or more and 3 minutes or less.

Note that it is necessary to excessively lower the transport speed when the heat treatment is performed for a holding time of about 5 minutes to about 180 minutes as disclosed in Japanese Patent Laid-Open No. 2008-123964, and thus it is conceivably difficult to use a general continuous furnace from the viewpoint of mass productivity. Therefore, it is conceivable to perform heat treatment on a coiled Cu-coated material, for example, for a holding time of about 5 minutes to about 180 minutes using a batch-type heat treatment furnace. When a long strip-shaped Cu-covered material is coiled, paper is commonly inserted in order to prevent adhesion between the Cu-coated materials adjacent to each other in the radial direction of the coil. Thus, the coiled Cu-coated material in which the paper has been inserted is heated by the heat treatment. As a result of attempting to heat the coiled Cu-coated material using a batch-type heat treatment furnace, the present inventors have found that there is a problem that C derived from the paper is deposited on surfaces of Cu layers of the Cu-coated material, and the deposition cannot be removed even by pickling. On the other hand, according to the present invention, the aging treatment is performed for a short period of time as described above such that the foil for a negative electrode collector can be continuously produced by the roll-to-roll method, and thus the above problem to occur when a batch-type heat treatment furnace is used does not occur.

In the method for manufacturing a foil for a negative electrode collector of a secondary battery according to the second aspect, as described above, a Cu-coated material having a first thickness of more than 20 μm is produced, and the produced Cu-coated material is rolled to a second thickness of 20 μm or less. Thus, as compared with the case in which a Cu-coated foil having a second thickness of 20 μm or less is directly formed by respectively disposing Cu layers on opposite surfaces of an iron-based alloy foil (iron-based alloy plate material) having a small thickness of less than 20 μm, which is not easy to handle, the Cu layers can be respectively disposed on the opposite surfaces of the iron-based alloy plate material in a state in which the thickness of the iron-based alloy plate material is relatively large and the mechanical strength thereof is high, and thus difficulty in manufacture the foil for a negative electrode collector having a thickness of 20 μm or less can be significantly reduced or prevented.

Preferably in the aforementioned method for manufacturing a foil for a negative electrode collector of a secondary battery according to the second aspect, the conditions of the aging treatment (short-time aging treatment) at a temperature of 500° C. or higher and 650° C. or lower for a holding time of 0.5 minutes or more and 3 minutes or less are more appropriately adjusted such that the Cu-coated foil having an elastic limit stress $\sigma_{0.01}$ of 700 MPa or more is obtained. According to this structure, even when the thickness of a negative electrode active material layer becomes larger and a stress applied to the foil for a negative electrode collector becomes larger during use of the secondary battery, plastic deformation of the foil for a negative electrode collector can be sufficiently significantly reduced or prevented. Thus, even when a stress is repetitively applied due to expansion and contraction of a negative electrode active material during use of the secondary battery, formation of wrinkle-like irregularities on the foil for a negative electrode collector can be sufficiently significantly reduced or prevented. Consequently, occurrence of cracks in the negative electrode active material layer disposed on the foil for a negative electrode collector can be sufficiently significantly reduced or prevented.

In the aforementioned method for manufacturing a foil for a negative electrode collector of a secondary battery according to the second aspect, a metal element that constitutes the precipitation hardened stainless steel may diffuse into the Cu layers of the Cu-coated foil on which the aging treatment has been performed, and a portion of the diffused metal element may exist as a precipitate in the Cu layers. Even with such a structure, as described above, the iron-based alloy layer and the Cu layers can be brought into close contact with each other due to diffusion of the metal element, and due to the action of the aging treatment performed when the precipitation hardened stainless steel is used, the volume resistivities of the Cu layers can be decreased, and thus the conductivity of the foil for a negative electrode collector is ensured.

Preferably in the aforementioned method for manufacturing a foil for a negative electrode collector of a secondary battery according to the second aspect, the Cu-coated material having a first thickness of more than 20 μm is rolled to a second thickness of 20 μm or less under a condition of a rolling reduction of 70% or more. According to this structure, the elastic limit of the iron-based alloy layer can be increased due to work-hardening or work-induced martensite transformation, and thus the foil for a negative electrode collector having a large elastic limit can be obtained. It has been confirmed by an experiment that the elastic limit of the iron-based alloy layer can be further increased by performing the aging treatment after the rolling under a condition of a rolling reduction of 70% or more.

Preferably in the aforementioned method for manufacturing a foil for a negative electrode collector of a secondary battery according to the second aspect, a Cu-coated intermediate material in which a pair of Cu plate materials made of the Cu or the Cu-based alloy are bonded onto the opposite surfaces of the iron-based alloy plate material is produced, the Cu-coated intermediate material is rolled to the first thickness, and thereafter annealing is performed at a temperature of 850° C. or higher and 1050° C. or lower for a holding time of 0.3 minutes or more and 3 minutes or less such that the Cu-coated material made of a clad material and having the first thickness is produced. According to this structure, it is possible to provide the foil for a negative electrode collector of a secondary battery, made of the clad material (Cu-coated foil) having a second thickness of 20 μm or less in which the iron-based alloy layer and the Cu layers have been brought in close contact with each other after the aging treatment (short-time aging treatment) and having a sufficiently preferable elastic limit and sufficiently preferable conductivity. In addition, after the Cu-coated intermediate material is rolled to form the Cu-coated material having the first thickness, annealing is performed at a temperature of 850° C. or higher and 1050° C. or lower for a holding time of 0.3 minutes or more and 3 minutes or less such that the rolling properties can be improved by decreasing the mechanical strength of the Cu-coated material made of the clad material due to the annealing, and thus the Cu-coated material having the first thickness can be easily rolled to a second thickness of 20 μm or less. On the other hand, the Cu-coated material having the first thickness is annealed at a temperature of 850° C. or higher and 1050° C. or lower such that the metal element of the iron-based alloy layer may diffuse into the Cu plate materials, and the volume resistivities of the Cu layers may be increased. However, the Cu-coated material having a first thickness of more than 20 μm is rolled to a second thickness of 20 μm or less, and thereafter the aging treatment (short-time aging treatment) is performed at a temperature of 500° C. or higher and 650° C. or lower for a holding time of 0.5 minutes or more and 3 minutes or less such that the volume resistivities of the Cu layers increased during the annealing can be decreased, and thus it is possible to reliably produce the foil for a negative electrode collector of a secondary battery, which the Cu-coated foil having a second thickness of 20 μm or less constitutes and which has a volume resistivity of 7 μΩ·cm or less. It has been confirmed by an experiment that the increased volume resistivities of the Cu layers can be decreased due to the aging treatment.

Preferably in the aforementioned method for manufacturing a foil for a negative electrode collector of a secondary battery according to the second aspect, the opposite surfaces of the iron-based alloy plate material is plated with the Cu or the Cu-based alloy such that the Cu-coated material having the first thickness, in which the pair of Cu layers including Cu-plated layers made of the Cu or the Cu-based alloy are formed on the opposite surfaces of the iron-based alloy layer, is produced. According to this structure, the Cu-coated material having the first thickness is rolled to a second thickness of 20 μm or less such that it is possible to provide the foil for a negative electrode collector of a secondary battery, in which the Cu layers are the Cu-plated layers, which the Cu-coated foil having a second thickness of 20 μm or less constitutes, and having a sufficient elastic limit and sufficient conductivity. Furthermore, when the opposite surfaces of the iron-based alloy plate material are plated with the Cu or the Cu-based alloy by hoop plating treatment in which plating is continuously performed, for example, the plating treatment and the aging treatment can be continuously performed. Thus, the coiled foil for a negative electrode collector is continuously produced such that the productivity of the foil for a negative electrode collector can be more easily improved. When the pair of Cu layers including the Cu-plated layers are formed by the plating treatment such as the hoop plating treatment, an iron alloy plate material having a sufficiently small thickness of less than 20 μm is plated with the Cu or the Cu-based alloy such that the Cu-coated foil having a second thickness of 20 μm or less can also be formed. In such a case, the aging treatment may be directly performed without rolling and annealing (diffusion annealing). On the other hand, when the Cu-coated material in which the pair of Cu layers including the Cu-plated layers are formed has a thickness of more than 20 μm after the plating treatment, the Cu-coated material may be rolled to the second thickness, and if necessary, annealing (diffusion annealing) followed by the aging treatment may be performed.

Effect of the Invention

According to the present invention, as described above, it is possible to provide the foil for a negative electrode collector of a secondary battery having a sufficient elastic limit and sufficient conductivity even in the case of a thinner foil having a thickness of 20 μm or less and the method for manufacturing the same.

BRIEF DESCRIPTION OF THE DRAWINGS

FIG. 10 A photograph showing an SEM image of a precipitate of the test material 6e.

FIG. 11 A photograph showing an EPMA image of the precipitate of the test material 6e.

MODES FOR CARRYING OUT THE INVENTION

Embodiments of the present invention are hereinafter described on the basis of the drawings. In the present invention, distinctively, one having a second thickness of 20 μm or less is referred to as the "Cu-coated foil", one having a first thickness of more than 20 μm is referred to as the "Cu-coated material", and one having a thickness more than the first thickness before formed to have the first thickness is referred to as the "Cu-coated intermediate material". Furthermore, in the present invention, annealing performed mainly for significantly reducing or preventing peeling between layers during subsequent rolling by causing element diffusion to strengthen the bonding immediately after first rolling (see a roll-bonding step shown in FIG. 3) in which a pair of Cu plate materials are bonded onto opposite surfaces of an iron-based alloy plate material is particularly referred to as the "diffusion annealing".

First Embodiment

The structure of a battery 100 using a negative electrode collector foil 5b according to a first embodiment of the present invention is now described with reference to FIGS. 1 and 2.
(Structure of Battery)

Figure 1:
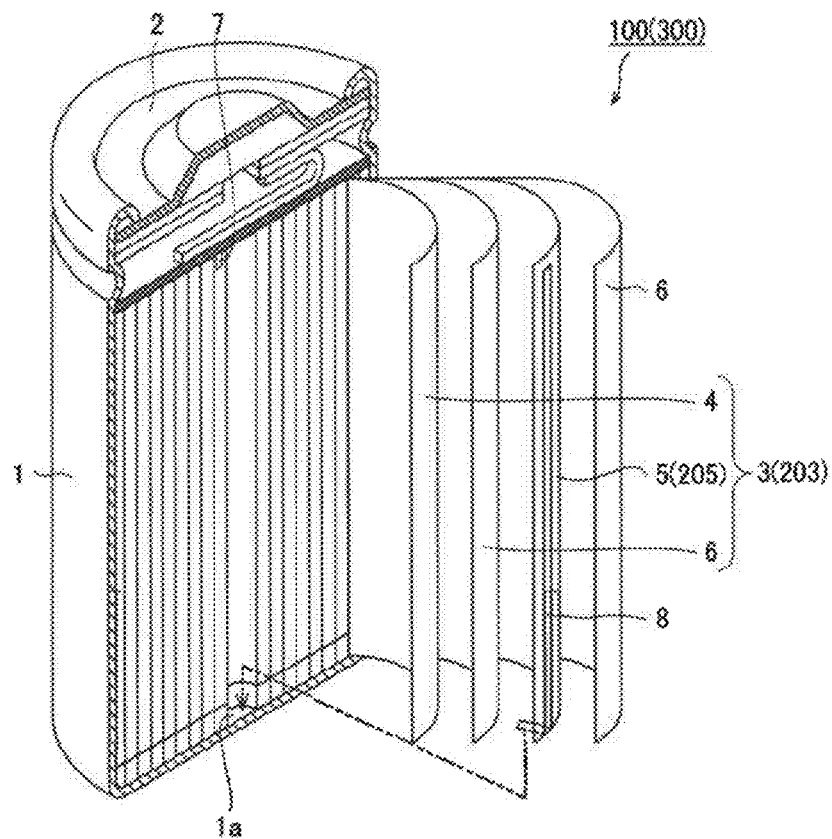
FIG. 1 A schematic sectional view showing a battery using a negative electrode collector foil according to first and second embodiments of the present invention.

As shown in FIG. 1, the battery 100 according to the embodiment of the present invention is a so-called cylindrical lithium-ion secondary battery. This battery 100 includes a cylindrical housing 1, a lid member 2 that seals an opening of the housing 1, and an electric storage element 3 disposed in the housing 1.

The housing 1 houses the electric storage element 3 and an electrolyte (not shown). The lid member 2 is made of an aluminum alloy, for example, and also serves as a positive electrode terminal (battery positive electrode) of the battery 100. The electric storage element 3 is formed by winding a positive electrode 4, a negative electrode 5, and an insulating separator 6 disposed between the positive electrode 4 and the negative electrode 5. The positive electrode 4 includes a positive electrode active material such as lithium cobaltate and a positive electrode collector foil made of an aluminum foil. The positive electrode active material is fixed onto a surface of the positive electrode collector foil by a binder or the like. Furthermore, a positive electrode lead member 7 that electrically connects the lid member 2 to the positive electrode 4 is fixed to the positive electrode 4.

Figure 2:
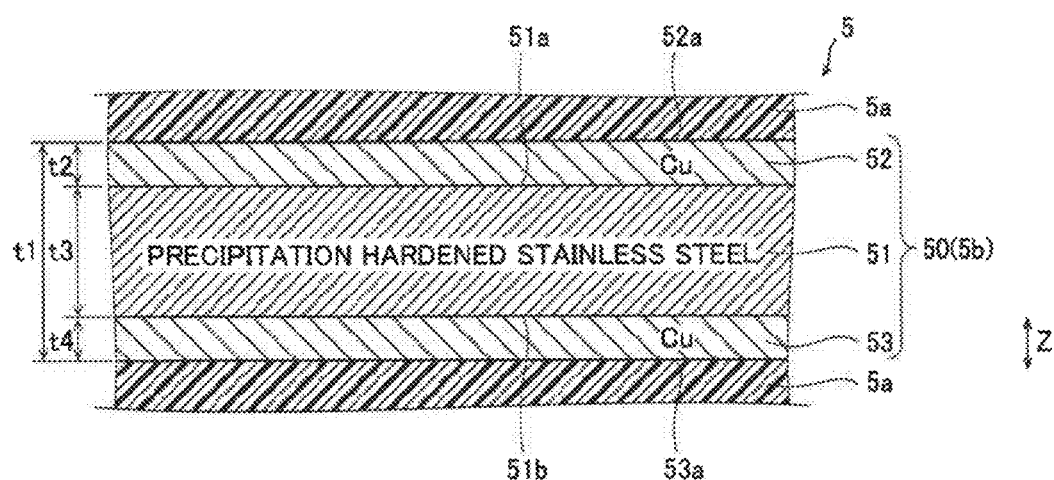
FIG. 2 A sectional view showing a negative electrode using the negative electrode collector foil according to the first embodiment of the present invention.

As shown in FIG. 2, the negative electrode 5 includes negative electrode active materials 5a and a negative electrode collector foil 5b to which the negative electrode active materials 5a are fixed by a binder or the like. The negative electrode active materials 5a each are made of a material capable of insertion and desorption of lithium, such as carbon, Si, and SiO. The negative electrode active materials 5a expand and contract in accordance with insertion and desorption of lithium, respectively. As shown in FIG. 1, a negative electrode lead member 8 that electrically connects the inner bottom surface 1a of the housing 1 to the negative electrode 5 is fixed to the negative electrode collector foil 5b of the negative electrode 5. The negative electrode collector foil 5b is an example of a "foil for a negative electrode collector of a secondary battery" in the claims.
(Configuration of Negative Electrode Collector)

In the first embodiment, the negative electrode collector foil 5b is a Cu-coated foil 50 made of a clad material having a three-layer structure and including an iron-based alloy layer 51 made of precipitation hardened stainless steel and Cu layers 52 and 53 respectively bonded onto opposite surfaces 51a and 51b of the iron-based alloy layer 51 in a thickness direction (Z direction). At a bonding interface between the iron-based alloy layer 51 and the Cu layer 52 and at a bonding interface between the iron-based alloy layer 51 and the Cu layer 53, bonding between metals at the atomic level occurs. The negative electrode active materials 5a are respectively fixed onto a surface 52a of the Cu layer 52 opposite to the side bonded to the iron-based alloy layer 51 and a surface 53a of the Cu layer 53 opposite to the side bonded to the iron-based alloy layer 51 by a binder.

The precipitation hardened stainless steel of which the iron-based alloy layer 51 is made is an iron-based alloy capable of increasing an elastic limit, which is a type of mechanical strength, by performing aging treatment at a precipitation hardening temperature to form fine precipitates. The precipitation hardened stainless steel includes SUS630, SUS631, etc. according to JIS G4305, for example.

The precipitation hardened stainless steel is preferably an iron-based alloy that contains 15 mass % or more and 19 mass % or less of Cr (chromium), 6 mass % or more and 9 mass % or less of Ni (nickel), 0.5 mass % or more and 2.0 mass % or less of Al (aluminum), 0.01 mass % or more and 0.3 mass % or less of C (carbon), 0.01 mass % or more and 0.3 mass % or less of N (nitrogen), the balance Fe (iron), and inevitable impurities.

In addition, precipitates are generated in the iron-based alloy layer 51 due to the aging treatment. Thus, the iron-based alloy layer 51 is precipitation-hardened, and thus the elastic limit of the iron-based alloy layer 51 is improved. When SUS631 or the iron-based alloy having the above composition is used as the precipitation hardened stainless steel, for example, particles (intermetallic compound phases) of intermetallic compounds that contain fine Al or Ni or that contain both Al and Ni are conceivably generated and dispersed as precipitates in the iron-based alloy layer 51, and particles that contain C or N or that contain both C and N are conceivably generated as precipitates in a dislocation portion. Furthermore, when SUS630 is used as the precipitation hardened stainless steel, for example, Cu-rich particles (Cu-enriched phases) are conceivably generated and dispersed as precipitates in the iron-based alloy layer 51.

The Cu layers 52 and 53 are layers produced using a Cu plate material that contains 99 mass % or more of Cu, and are mainly made of Cu (copper). In addition, the Cu layers 52 and 53 contain some of metal elements of which the iron-based alloy layer 51 is made. In annealing (diffusion annealing and softening annealing) described below, some of the metal elements diffuse from the iron-based alloy layer 51 into the Cu layers 52 and 53 such that diffusion occurs in regions of the Cu layers 52 and 53 mainly on the iron-based alloy layer 51 side, and some of the diffused metal elements exist as precipitates due to the aging treatment.

Specifically, when SUS631 or the iron-based alloy having the above composition is used as the precipitation hardened stainless steel of which the iron-based alloy layer 51 is made, for example, one or more of Al, Fe, Cr, Ni, and Ni conceivably diffuse into the Cu layers 52 and 53. Furthermore, when SUS630 is used as the precipitation hardened stainless steel of which the iron-based alloy layer 51 is made, for example, Fe and Cr conceivably diffuse into the Cu layers 52 and 53.

In the first embodiment, the volume resistivity (an electric resistance value per unit volume) of the negative electrode collector foil 5b is 7 µΩ·cm or less. Thus, the conductivity of the negative electrode collector foil 5b can be increased to 24.6% IACS or more. Note that "the conductivity of the negative electrode collector foil 5b is 24.6% IACS or more" indicates that when the conductivity of international standard annealed copper having a volume resistivity of 1.7241 µΩ·cm is taken as 100%, the conductivity of the negative electrode collector foil 5b is 24.6 (=1.7241 (µΩ·cm)/7 (µΩ·cm)×100)% IACS or more. The volume resistivity (an electric resistance value per unit volume) of the negative electrode collector foil 5b is preferably 5 µΩ·cm or less. Consequently, the conductivity of the negative electrode collector foil 5b is 34.5 (=1.7241 (µΩ·cm)/5 (µΩ·cm)× 100)% IACS or more. The volume resistivity of the negative electrode collector foil 5b is more preferably 4.8 µΩ·cm or less (the conductivity of the negative electrode collector foil 5b is more preferably 35.9% IACS or more).

The length (thickness) t1 in the Z direction of the Cu-coated foil 50 that constitutes the negative electrode collector foil 5b is 20 µm or less. It is preferable to make the Cu-coated foil 50 that constitutes the negative electrode collector foil 5b thinner in order to improve the battery capacity of the battery 100. Therefore, the thickness t1 is preferably about 15 µm or less, more preferably about 12 µm or less, and still more preferably about 10 µm or less. Furthermore, in order to avoid difficulty in producing the negative electrode collector foil 5b, the thickness t1 is preferably about 3 µm or more, and more preferably about 5 µm or more.

Furthermore, a clad material (Cu-coated foil 50) in which the thickness ratio of the Cu layer 52, the iron-based alloy layer 51, and the Cu layer 53 (the thickness t2 of the Cu layer 52: the thickness t3 of the iron-based alloy layer 51: the thickness t4 of the Cu layer 53) in the Z direction is about "1:3:1", for example, may be used. That is, when the thickness t1 of the Cu-coated foil 50 in the Z direction is about 10 µm, the thickness t2 of the Cu layer 52, the thickness t3 of the iron-based alloy layer 51, and the thickness t4 of the Cu layer 53 may be about 2 µm, about 6 µm, and about 2 µm, respectively. The thicknesses t1 to t4 are average values of the thicknesses measured at a plurality of positions of the negative electrode collector foil 5b.

The thickness ratio between the Cu layer 52, the iron-based alloy layer 51, and the Cu layer 53 is not restricted to about "1:3:1". That is, the iron-based alloy layer 51 is not restricted to an iron-based alloy layer having a thickness more than the thicknesses of the Cu layers 52 and 53, but the iron-based alloy layer 51 may have a thickness less than or equal to the thicknesses of the Cu layers 52 and 53. Furthermore, the thickness of the Cu layer 52 and the thickness of the Cu layer 53 may be different from each other. Note that the thickness ratio is preferably in the range from about "1:8:1" to about "3:4:3" in order to ensure sufficient electrical conductivity in the Cu layers 52 and 53 and ensure a high elastic limit (high mechanical strength) in the iron-based alloy layer 51. That is, the thickness of the iron-based alloy layer 51 is preferably about 40% or more and about 80% or less of the thickness of the negative electrode collector foil 5b (Cu-coated foil 50), and the thickness of the Cu layer 52 and the thickness of the Cu layer 53 are about 10% or more and about 30% or less of the thickness of the negative electrode collector foil 5b (Cu-coated foil 50). Therefore, the thickness of the iron-based alloy layer 51 is preferably more than the thickness of the Cu layer 52 and the thickness of the Cu layer 53.

In the first embodiment, the elastic limit stress $\sigma_{0.01}$ of the negative electrode collector foil 5b is preferably about 700 MPa or more. Thus, when a stress of less than about 700 MPa is applied to the negative electrode collector foil 5b, in the negative electrode collector foil 5b, plastic deformation hardly occurs, and only elastic deformation is allowed to occur. Consequently, even when charging and discharging are repeatedly performed in the battery 100, it is possible to significantly reduce or prevent formation of wrinkle-like irregularities on the negative electrode collector foil 5b. The elastic limit stress $\sigma_{0.01}$ of the negative electrode collector foil 5b is more preferably about 750 MPa or more.

(Process for Manufacturing Negative Electrode Collector Foil)

A process for manufacturing the negative electrode collector foil 5b according to the first embodiment is now described with reference to FIGS. 2 and 3.

Figure 3:
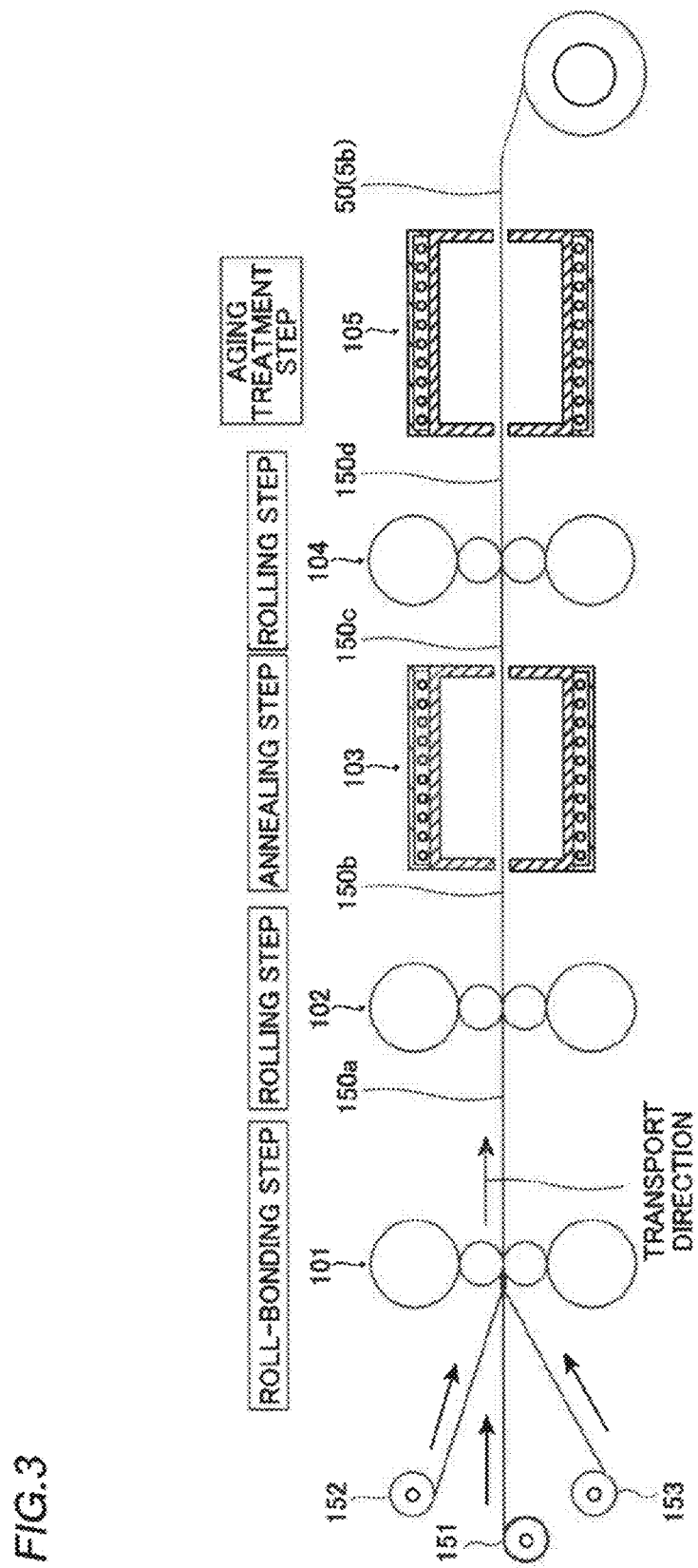
FIG. 3 A schematic view illustrating a method for producing the negative electrode collector foil according to the first embodiment of the present invention.

First, as shown in FIG. 3, an iron-based alloy plate material 151 made of precipitation hardened stainless steel and a pair of Cu plate materials 152 and 153 that contain 99 mass % or more of Cu, for example, are prepared. At this time, the iron-based alloy plate material 151 and the pair of Cu plate materials 152 and 153 can be prepared such that the thickness ratio of the Cu plate material 152, the iron-based alloy plate material 151, and the Cu plate material 153 (the thickness of the Cu plate material 152: the thickness of the iron-based alloy plate material 151: the thickness of the Cu plate material 153) is "about 1:3:1". Note that in order to facilitate preparation and significantly reduce or prevent occurrence of breakage or the like during rolling described below, the thickness of the iron-based alloy plate material 151 and the thicknesses of the pair of Cu plate materials 152 and 153 are preferably more than 20 µm (more preferably about 100 µm). For example, the thickness of the iron-based alloy plate material 151 may be about 0.45 mm, and the thicknesses of the Cu plate materials 152 and 153 may be about 0.15 mm.

Both the Cu plate materials 152 and 153 can be made of oxygen-free copper that contains 99.96 mass % or more of Cu, phosphorus deoxidized copper that contains 99.75 mass % or more of Cu, or tough pitch copper that contains 99.9 mass % or more of Cu, for example. The Cu plate materials 152 and 153 may be Cu plate materials having the same composition or may be Cu plate materials having different compositions.

Then, in a roll-bonding step shown in FIG. 3, cold roll-bonding (room temperature: about 20° C. or higher and about 40° C. or lower, for example) can be performed using a roller 101 in a state in which the iron-based alloy plate material 151 is sandwiched between the pair of Cu plate materials 152 and 153 in the thickness direction. Thus, a Cu-coated intermediate material 150*a* in which the pair of Cu plate materials 152 and 153 are bonded in layers onto opposite surfaces of the iron-based alloy plate material 151 can be produced. Thereafter, in a rolling step next to the roll-bonding step, cold rolling (room temperature) is performed on the Cu-coated intermediate material 150*a* using a roller 102 such that a Cu-coated material 150*b* having a first thickness of more than 20 μm and less than 100 μm can be produced. Note that the thickness of the Cu-coated material 150*b* is preferably more than 40 μm and not more than 80 μm. The Cu-coated intermediate material 150*a* and the Cu-coated material 150*b* are examples of a "Cu-coated intermediate material" and a "Cu-coated material" in the claims.

Then, in an annealing step shown in FIG. 3, the Cu-coated material 150*b* having the first thickness can be annealed. At this time, the Cu-coated material 150*b* is placed in an annealing furnace 103 set at a temperature of 850° C. or higher and 1050° C. or lower and is held for 0.3 minutes or more and 3 minutes or less, which is sufficiently shorter than the holding time (about 5 minutes or more) disclosed in Japanese Patent Laid-Open No. 2008-123964. The temperature in the annealing furnace 103 is preferably 850° C. or higher and 1000° C. or lower, and more preferably 930° C. or higher and 980° C. or lower. The annealing (holding) time in the annealing furnace 103 is preferably 0.5 minutes or more and 3 minutes or less. The interior of the annealing furnace 103 is preferably set to a non-oxidizing atmosphere such as a nitrogen atmosphere. In the annealing step shown in FIG. 3, softening annealing is performed to cause softening at the first thickness (about 50 μm, for example), and thinning at the subsequent rolling can be facilitated. Although not shown in FIG. 3, the above annealing can be performed at a stage (about 150 μm, for example) at which the thickness is larger than the first thickness immediately after the roll-bonding step. In this case, the annealing is diffusion annealing, and element diffusion is caused to strengthen the bonding between the layers such that peeling between the layers during the subsequent rolling can be significantly reduced or prevented.

Thus, a Cu-coated material 150*c* made of a clad material (see FIG. 2) having a thickness (first thickness) of more than 20 μm and less than 100 μm and in which the Cu layers 52 and 53 are bonded onto the opposite surfaces of the iron-based alloy layer 51 can be produced. Furthermore, at a bonding interface between the iron-based alloy plate material 151 (iron-based alloy layer 51) and the Cu plate material 152 (Cu layer 52) and at a bonding interface between the iron-based alloy plate material 151 (iron-based alloy layer 51) and the Cu plate material 153 (Cu layer 53), bonding between metals at the atomic level can be formed by the above annealing. In addition, the mechanical strength (such as the hardness) of the Cu-coated material 150*c* (especially the iron-based alloy plate material 151) is decreased by the above annealing.

On the other hand, in the above annealed Cu-coated material 150*c*, some of the metal elements of which the iron-based alloy layer 51 is made diffuse into the Cu layers 52 and 53 due to the annealing. When the iron-based alloy layer 51 is made of an iron-based alloy that contains 15 mass % or more and 19 mass % or less of Cr, 6 mass % or more and 9 mass % or less of Ni, 0.5 mass % or more and 2.0 mass % or less of Al, 0.01 mass % or more and 0.3 mass % or less of C, 0.01 mass % or more and 0.3 mass % or less of N, the balance Fe, and inevitable impurities, or SUS631, for example, one or more of Al, Fe, Cr, etc. conceivably diffuse into the Cu layers 52 and 53. In addition, when the iron-based alloy layer 51 is made of SUS630, for example, one or more of Fe and Cr conceivably diffuse into the Cu layers 52 and 53. When the above diffusion annealing is performed mainly for strengthening bonding between layers due to element diffusion at the stage (about 150 μm, for example) at which the thickness is larger than the first thickness immediately after the roll-bonding step, element diffusion occurs at a level equal to or more than that in the case in which the above annealing (softening annealing) is performed at the first thickness (about 50 μm, for example).

Here, as compared with the case in which the rolling is repeated such that the thickness of the Cu-coated material 150*c* becomes 0.2 mm as in Example disclosed in Japanese Patent Laid-Open No. 2008-123964, the thickness (first thickness) of the Cu-coated material 150*c*, which is more than 20 μm and less than 100 μm, is smaller, and thus the thicknesses of the Cu layers 52 and 53 also become relatively small. Therefore, the proportion of the diffusion distances of the metal elements, of which the iron-based alloy layer 51 is made, to the thicknesses of the Cu layers 52 and 53 increases such that in the Cu-coated material 150*c*, the volume resistivities of the Cu layers 52 and 53 increase.

Then, in a rolling step next to the annealing step, cold rolling (room temperature) is performed on the annealed Cu-coated material 150*c* using a roller 104 such that a Cu-coated foil 150*d* having a thickness (second thickness) of 20 μm or less can be produced. At this time, rolling is performed such that the rolling reduction of the roller 104 is preferably about 70% or more. When the thickness (first thickness) of the Cu-coated material 150*c* before rolling is about 66 μm or more, for example, the rolling reduction is preferably set to more than 70% such that the thickness (second thickness) of the Cu-coated foil 150*d* after rolling is 20 μm or less. In addition, when the thickness (first thickness) of the Cu-coated material 150*c* before rolling is about 90 μm, the rolling reduction is preferably set to about 78% or more. The rolling reduction of the roller 104 is preferably about 80% or more in order to improve the elastic limit. Furthermore, the rolling reduction of the roller 104 is preferably about 90% or less, and more preferably about 85% or less in order to significantly reduce or prevent rolling difficulty.

Then, in an aging treatment step shown in FIG. 3, aging treatment is performed on the Cu-coated foil 150*d* having a thickness (second thickness) of 20 μm or less using a heat treatment furnace 105. At this time, the Cu-coated foil 150*d* is placed in the heat treatment furnace 105 set at a temperature of 500° C. or higher and 650° C. or lower (aging treatment temperature) and is held for 0.5 minutes or more and 3 minutes or less (aging treatment time), which is sufficiently shorter than the holding time (about 5 minutes or more) disclosed in Japanese Patent Laid-Open No. 2008-123964. Although the interior of the heat treatment furnace 105 is preferably set to a non-oxidizing atmosphere such as a nitrogen atmosphere, it may be set to an oxidizing atmosphere (normal atmosphere) or a hydrogen atmosphere. In addition, the aging treatment temperature is preferably 520° C. or higher in order to sufficiently perform the aging treatment to further improve the elastic limit. Furthermore, the aging treatment temperature is preferably 580° C. or lower in order to significantly reduce the influence of heating during the aging treatment.

Thus, the negative electrode collector foil 5b (see FIG. 2) that the Cu-coated foil 50 constitutes, having a thickness (second thickness) of 20 μm or less, and having an elastic limit increased due to precipitation hardening can be produced.

Here, in the negative electrode collector foil 5b (Cu-coated foil 50) on which the aging treatment has been performed, the influence of increases in the volume resistivities of the Cu layers 52 and 53 caused by the metal elements diffused into the Cu layers 52 and 53 during the annealing has been reduced. Thus, the volume resistivity of the negative electrode collector foil 5b is decreased to 7 μΩ·cm or less (preferably 5 μΩ·cm or less).

In the first embodiment, as shown in FIG. 3, the negative electrode collector foil 5b can be continuously produced by a roll-to-roll method. That is, the coiled negative electrode collector foil 5b can be produced using the coiled iron-based alloy plate material 151, the coiled Cu plate material 152, and the coiled Cu plate material 153. Both the annealing furnace 103 and the heat treatment furnace 105 are continuous furnaces.

The coiled negative electrode collector foil 5b continuously produced by the roll-to-roll method can be cut to a desired length when used as a negative electrode collector foil of the battery 100. The aging treatment on the Cu-coated foil 150d may not be continuously performed by the roll-to-roll method as shown in FIG. 3. For example, the Cu-coated foil 150d that has undergone the annealing step and the rolling step shown in FIG. 3 is taken out, the Cu-coated foil 150d is cut to the same length as the length to be used as the negative electrode collector foil of the battery 100, and then the cut Cu-coated foil is placed in a batch-type heat treatment furnace or the cut Cu-coated foils are disposed side by side and are allowed to pass through a continuous heat treatment furnace such that the same aging treatment as described above can be performed.

Advantageous Effects of First Embodiment

According to the first embodiment, the following advantageous effects are achieved.

According to the first embodiment, as described above, the thickness of the negative electrode collector foil 5b is 20 μm or less, and the volume resistivity thereof is 7 μΩ·cm or less (preferably 5 μΩ·cm or less) such that the conductivity of the negative electrode collector foil 5b can be 24.6% IACS or more (preferably 34.5% IACS or more). Furthermore, the iron-based alloy layer 51 is made of precipitation hardened stainless steel such that the elastic limit of the iron-based alloy layer 51 can be improved by precipitation hardening through the aging treatment, and thus the elastic limit of the negative electrode collector foil 5b can be improved. Consequently, it is possible to provide the negative electrode collector foil 5b having a sufficient elastic limit and sufficient conductivity even when the thickness is 20 μm or less.

According to the first embodiment, the elastic limit of the negative electrode collector foil 5b is improved such that even when the thicknesses of the negative electrode active materials 5a become larger and a stress applied to the negative electrode collector foil 5b becomes larger, plastic deformation of the negative electrode collector foil 5b can be significantly reduced or prevented. Thus, even when a stress is repetitively applied due to expansion and contraction of the negative electrode active materials 5a during use of the battery 100, formation of wrinkle-like irregularities on the negative electrode collector foil 5b can be significantly reduced or prevented. Consequently, occurrence of cracks in the negative electrode active materials 5a disposed on the negative electrode collector foil 5b can be significantly reduced or prevented.

According to the first embodiment, the elastic limit stress $\sigma_{0.01}$ of the negative electrode collector foil 5b is preferably 700 MPa or more. According to this structure, even when the thicknesses of the negative electrode active materials 5a become larger and a stress applied to the negative electrode collector foil 5b becomes larger, plastic deformation of the negative electrode collector foil 5b can be significantly reduced or prevented. Accordingly, even when a stress is repetitively applied due to expansion and contraction of the negative electrode active materials 5a disposed on the negative electrode collector foil 5b during use of the battery 100, formation of wrinkle-like irregularities on the negative electrode collector foil 5b can be sufficiently significantly reduced or prevented. Consequently, occurrence of cracks in the negative electrode active materials 5a disposed on the negative electrode collector foil 5b can be sufficiently significantly reduced or prevented.

According to the first embodiment, the precipitation hardened stainless steel of which the iron-based alloy layer 51 is made preferably contains 15 mass % or more and 19 mass % or less of Cr, 6 mass % or more and 9 mass % or less of Ni, 0.5 mass % or more and 2.0 mass % or less of Al, 0.01 mass % or more and 0.3 mass % or less of C, 0.01 mass % or more and 0.3 mass % or less of N, the balance Fe, and inevitable impurities. According to this structure, due to the aging treatment, fine precipitates of Al and Ni are formed in the iron-based alloy layer 51, and anchoring of dislocations caused by C and N occurs. Thus, the elastic limits of the iron-based alloy layer 51 and the negative electrode collector foil 5b can be improved.

According to the first embodiment, even when the metal elements that constitute the precipitation hardened stainless steel diffuse (solid-dissolve) into the Cu layers 52 and 53 and the volume resistivities of the Cu layers 52 and 53 increase, the aging treatment to be performed when the precipitation hardened stainless steel is used is performed for a predetermined short time (0.5 minutes or more and 3 minutes or less) such that the volume resistivities of the Cu layers 52 and 53 can be decreased. Thus, the conductivity of the negative electrode collector foil 5b is ensured.

According to the first embodiment, the negative electrode collector foil 5b is the Cu-coated foil 50 made of the clad material in which the Cu layers 52 and 53 are respectively bonded onto the opposite surfaces of the iron-based alloy layer 51. Accordingly, it is possible to provide the negative electrode collector foil 5b having a thickness of 20 μm or less, having a sufficient elastic limit and sufficient conductivity, and made of the clad material in which the iron-based alloy layer 51 is closely bonded to the Cu layers 52 and 53.

In the manufacturing method according to the first embodiment, the Cu-coated material 150c is rolled to a second thickness of 20 μm or less to prepare the Cu-coated foil 150d, and then the aging treatment is performed such that the Cu-coated foil 150d is held at a temperature of 500° C. or higher and 650° C. or lower for 0.5 minutes or more and 3 minutes or less. Accordingly, even when the volume resistivity of the Cu-coated material 150c before rolled to a second thickness of 20 μm or less increases, the aging treatment is performed under the above conditions such that the volume resistivity of the negative electrode collector foil 5b can be decreased to 7 μΩ·cm or less. Consequently, it is possible to provide the negative electrode collector foil 5b having a sufficient elastic limit and sufficient conductivity even when the thickness is 20 μm or less.

In the manufacturing method according to the first embodiment, instead of the aging treatment with a holding time of about 5 minutes or more disclosed in Japanese Patent Laid-Open No. 2008-123964, the aging treatment (short-time aging treatment) in which the Cu-coated foil 150d is held at a temperature of 500° C. or higher and 650° C. or lower for 0.5 minutes or more and 3 minutes or less is performed. Accordingly, the aging treatment can be performed in a shorter time as compared with the case in which the conventional aging treatment with a holding time of about 5 minutes or more is performed. Consequently, the volume resistivity of the Cu-coated foil 50 (negative electrode collector foil 5b) is set to 7 μΩ·cm or less (preferably 5 μΩ·cm or less) such that the conductivity of the Cu-coated foil 50 (negative electrode collector foil 5b) can be set to 24.6% IACS or more (preferably 34.5% IACS or more), and an increase in the size of the continuous furnace (heat treatment furnace 105) is significantly reduced or prevented such that an increase in the size of the entire manufacturing apparatus for the negative electrode collector foil 5b can be significantly reduced or prevented. In addition, the negative electrode collector foil 5b can be continuously produced by the roll-to-roll method, and thus unlike the case in which the long strip-shaped Cu-coated material is coiled while paper is inserted in order to prevent adhesion between the Cu-coated materials and the aging treatment is performed in a batch-type heat treatment furnace, deposition of C on the surfaces of the Cu layers 52 and 53 can be prevented.

In the manufacturing method according to the first embodiment, the Cu-coated material 150c having a first thickness of more than 20 μm is produced and is rolled to a second thickness of 20 μm or less. Accordingly, as compared with the case in which the Cu-coated foil having a second thickness of 20 μm or less is directly formed by respectively disposing Cu layers on opposite surfaces of an iron-based alloy foil (iron-based alloy plate material) having a small thickness of less than 20 μm, which is not easy to handle, the Cu layers 52 and 53 can be respectively disposed on the opposite surfaces of the iron-based alloy plate material 151 in a state in which the thickness of the iron-based alloy plate material 151 is relatively large and the mechanical strength thereof is high, and thus difficulty in manufacture the negative electrode collector foil 5b having a thickness of 20 μm or less can be significantly reduced or prevented.

In the manufacturing method according to the first embodiment, the Cu-coated material 150c having a first thickness of more than 20 μm is rolled to a second thickness of 20 μm or less preferably under the conditions that the rolling reduction is 70% or more. According to this structure, the elastic limit of the iron-based alloy layer 51 can be increased due to work-hardening or work-induced martensite transformation, and thus the negative electrode collector foil 5b having a large elastic limit can be obtained.

In the manufacturing method according to the first embodiment, the Cu-coated intermediate material 150a can be produced by bonding the pair of Cu plate materials 152 and 153 made of Cu onto the opposite surfaces of the iron-based alloy plate material 151. Then, after the Cu-coated intermediate material 150a is rolled to the first thickness to produce the Cu-coated material 150b, the Cu-coated material 150b is annealed while held at a temperature of 850° C. or higher and 1050° C. or lower for 0.3 minutes or more and 3 minutes or less such that the Cu-coated material 150c having the first thickness can be produced. After the annealing, the Cu-coated material 150c having the first thickness is rolled to a second thickness of 20 μm or less such that the iron-based alloy layer 51 and the Cu layers 52 and 53 are brought into close contact with each other, and the clad material having a second thickness of 20 μm or less can be produced. Thereafter, the aging treatment is performed on the clad material having the second thickness such that the negative electrode collector foil 5b made of the clad material (Cu-coated foil) and having a sufficient elastic limit and sufficient conductivity can be provided.

In the manufacturing method according to the first embodiment, the Cu-coated material 150c is preferably annealed while held at a temperature of 850° C. or higher and 1050° C. or lower for 0.3 minutes or more and 3 minutes or less. According to this structure, the rolling properties can be improved by decreasing the mechanical strength of the Cu-coated material 150c made of the clad material due to the influence of heating during the annealing when the Cu-coated material 150c having the first thickness is produced, and thus the Cu-coated material 150c can be easily rolled to a second thickness of 20 μm or less. Furthermore, after the Cu-coated material 150c having a first thickness of more than 20 μm is rolled to a second thickness of 20 μm or less to produce the Cu-coated foil 150d, the aging treatment (short-time aging treatment) is performed on the Cu-coated foil 150d while the Cu-coated foil 150d is held at a temperature of 500° C. or higher and 650° C. or lower for 0.5 minutes or more for 3 minutes or less. Accordingly, the volume resistivities of the Cu layers 52 and 53 increased due to the influence of heating during the annealing can be decreased, and thus the negative electrode collector foil 5b having a thickness of 20 μm or less and a volume resistivity of 7 μΩ·cm or less (preferably 5 μΩ·cm or less) can be reliably produced.

Second Embodiment

Figure 4:
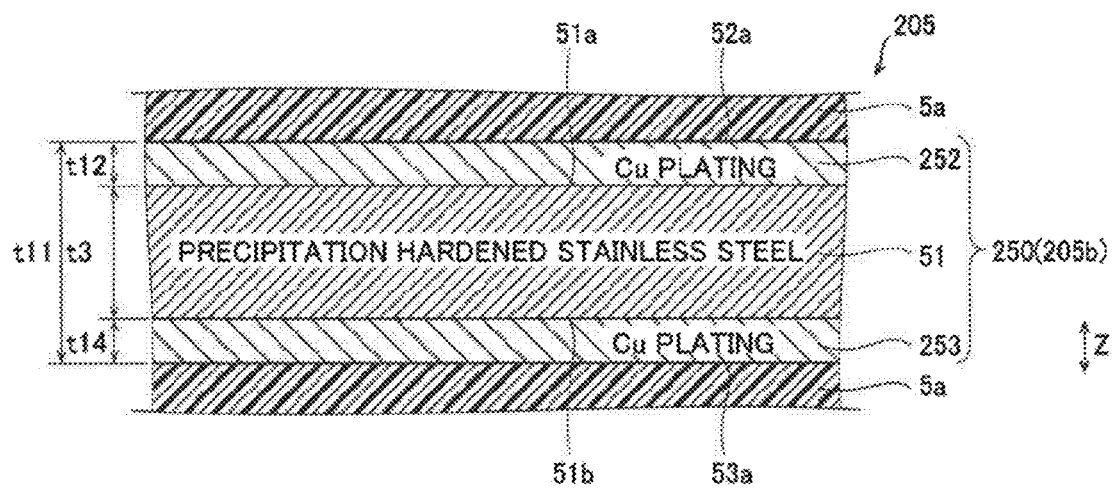
FIG. 4 A sectional view showing a negative electrode using a negative electrode collector foil according to a second embodiment of the present invention.

A negative electrode collector foil 205b according to a second embodiment of the present invention is now described with reference to FIGS. 1, 4, and 5. In the second embodiment, an example in which Cu-plated layers 252 and 253 are used instead of the Cu layers 52 and 53 of the negative electrode collector foil 5b according to the aforementioned first embodiment is described. The negative electrode collector foil 205b is an example of a "foil for a negative electrode collector of a secondary battery" in the claims.

(Structure of Battery)

As shown in FIG. 1, a battery 300 according to the second embodiment of the present invention includes an electric storage element 203 including a negative electrode 205. As shown in FIG. 4, the negative electrode 205 includes negative electrode active materials 5a and the negative electrode collector foil 205b.

(Configuration of Negative Electrode Collector)

In the second embodiment, the negative electrode collector foil 205b is a Cu-coated foil 250 including an iron-based alloy layer 51 made of precipitation hardened stainless steel and the Cu-plated layers 252 and 253 respectively plated on opposite surfaces 51a and 51b of the iron-based alloy layer 51 in a thickness direction (Z direction). That is, the negative electrode collector foil 205b has a three-layer structure. The negative electrode active materials 5a are respectively fixed onto a surface 52a of the Cu-plated layer 252 on the side opposite to the side on which the iron-based alloy layer 51 is disposed and a surface 53a of the Cu-plated layer 253 on the side opposite to the side on which the iron-based alloy layer 51 is disposed. The Cu-plate layers 252 and 253 are examples of a "Cu layer" in the claims.

The Cu-plated layers 252 and 253 are mainly made of Cu (copper). In addition, the Cu-plated layers 252 and 253 contain some of metal elements of which the iron-based alloy layer 51 is made. In annealing (see an annealing step shown in FIG. 5) described later, some of the metal elements diffuse from the iron-based alloy layer 51 into the Cu-plated layers 252 and 253 to be contained in regions of the Cu-plated layers 252 and 253 mainly on the iron-based alloy layer 51 side. Note that a base layer (a Ni-plated layer, for example) may be provided on the iron-based alloy layer 51, and the Cu-plated layers 252 and 253 may be provided on the base layer. Thus, adhesion between the iron-based alloy layer 51 and the Cu-plated layers 252 and 253 can be increased.

In the second embodiment, the volume resistivity (an electric resistance value per unit volume) of the negative electrode collector foil 205b is 7 μΩ·cm or less and preferably 5 μΩ·cm or less. The length (thickness) t11 of the Cu-coated foil 250 that constitutes the negative electrode collector foil 205b in the Z direction is 20 μm or less. It is preferable to make the Cu-coated foil 250 that constitutes the negative electrode collector foil 205b thinner in order to improve the battery capacity of the battery 300. Therefore, the thickness t11 is preferably about 15 μm or less, more preferably about 12 μm or less, and still more preferably about 10 μm or less. Furthermore, in order to avoid difficulty in producing the negative electrode collector foil 205b, the thickness t11 is preferably about 3 μm or more, and more preferably about 5 μm or more. The negative electrode collector foil 205b is formed such that the thickness ratio of the Cu-plated layer 252, the iron-based alloy layer 51, and the Cu-plated layer 253 (the thickness t12 of the Cu-plated layer 252: the thickness t3 of the iron-based alloy layer 51: the thickness t14 of the Cu-plated layer 253) in the direction Z is about "1:3:1". Note that the thickness ratio between the Cu-plated layer 252, the iron-based alloy layer 51, and the Cu-plated layer 253 is not restricted to about "1:3:1".

In the second embodiment, the elastic limit stress $\sigma_{0.01}$ of the negative electrode collector foil 205b is preferably about 700 MPa or more. The remaining configurations of the second embodiment are similar to those of the first embodiment.

(Process for Manufacturing Negative Electrode Collector Foil)

A process for manufacturing the negative electrode collector foil 205b according to the second embodiment is now described with reference to FIGS. 4 and 5.

Figure 5:
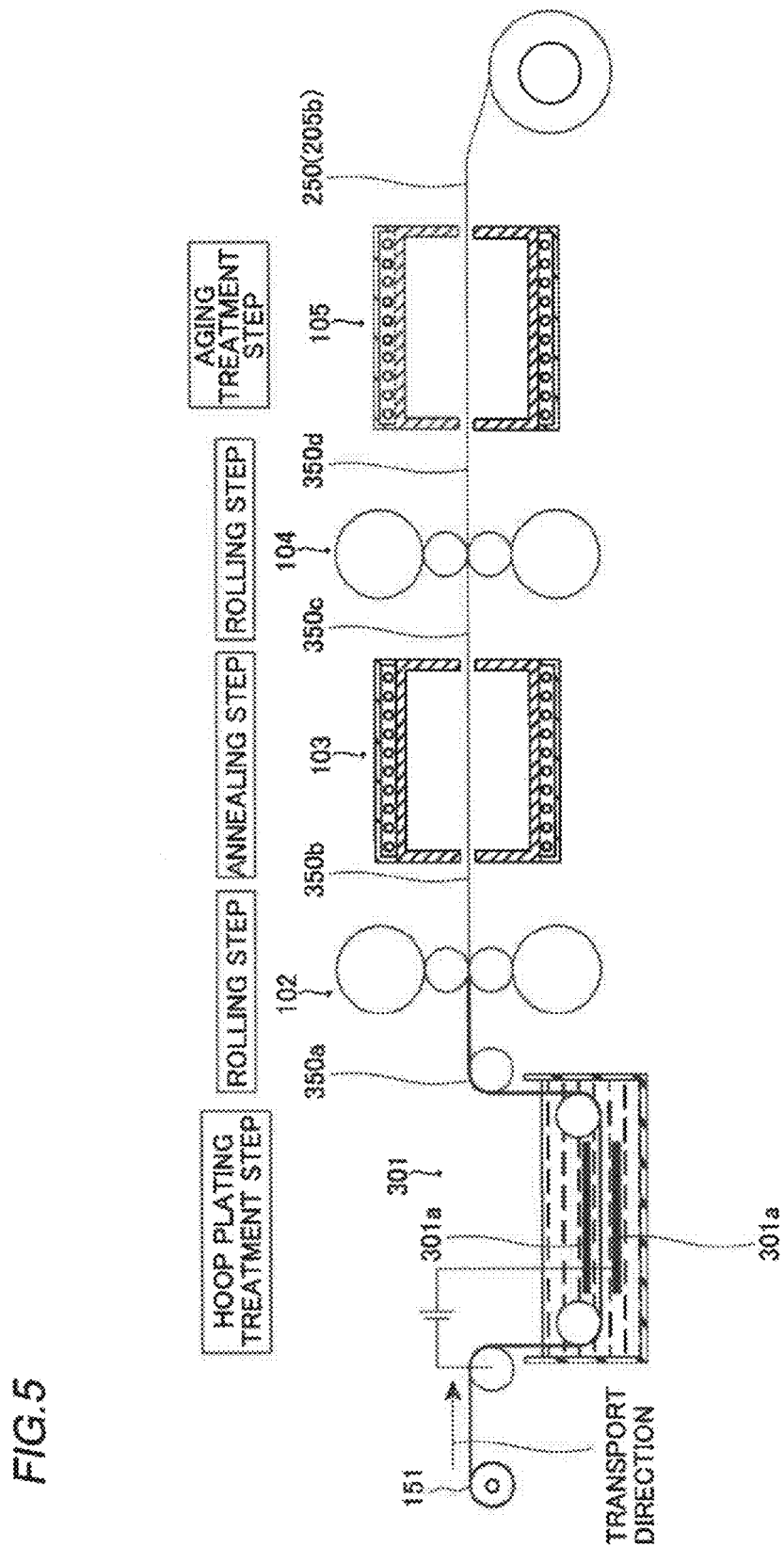
FIG. 5 A schematic view illustrating a method for producing the negative electrode collector foil according to the second embodiment of the present invention.

First, as shown in FIG. 5, an iron-based alloy plate material 151 made of precipitation hardened stainless steel and having a thickness of more than 20 μm is prepared. Then, plating treatment (hoop plating treatment) is performed on the iron-based alloy plate material 151 to produce a Cu-coated intermediate material 350a in which a pair of Cu-plated layers 252 and 253 (see FIG. 4) are respectively layered on the opposite surfaces of the iron-based alloy layer 51.

Specifically, in a hoop plating treatment step shown in FIG. 5, the Cu-plated layers 252 and 253 can be produced by allowing the iron-based alloy plate material 151 to pass through an electroplating bath 301. In the electroplating bath 301, a copper sulfate aqueous solution and Cu plate materials 301a disposed in the copper sulfate aqueous solution, connected to one electrode, and that contain 99.9 mass % or more of Cu, for example, are disposed. The Cu plate materials 301a may be oxygen-free copper that contains 99.96 mass % or more of Cu, phosphorus deoxidized copper that contains 99.75 mass % or more of Cu, or tough pitch copper that contains 99.9 mass % or more of Cu, for example. Then, when an electric current flows in a state in which the other electrode is connected to the iron-based alloy plate material 151, copper ions in the copper sulfate aqueous solution migrate to the opposite surfaces of the iron-based alloy plate material 151 (iron-based alloy layer 51) and precipitate thereon, and thus a Cu coating can be formed. Cu ions are gradually solid-dissolved from the Cu plate materials 301a into the copper sulfate aqueous solution to be replenished therein, and thus the Cu coating eventually grows into the Cu-plated layers 252 and 253. Thus, the Cu-coated intermediate material 350a in which the pair of Cu-plated layers 252 and 253 are respectively formed on the opposite surfaces of the iron-based alloy layer 51 can be produced.

The thicknesses of the Cu-plated layers 252 and 253 can be about ⅓ of the thickness of the iron-based alloy plate material 151, for example, by setting the passage time of the electroplating bath 301. That is, when the thickness of the iron-based alloy plate material 151 is about 60 μm, the plating treatment can be performed such that the thickness of each of the Cu-plated layers 252 and 253 becomes about 20 μm. Although not shown in FIG. 5, the iron-based alloy plate material 151 can be cleaned before the plating, and the Cu-coated intermediate material 350a can be cleaned and dried after the plating.

Thereafter, in a rolling step next to the hoop plating treatment step, cold rolling (room temperature: about 20° C. or higher and about 40° C. or lower, for example) is performed on the Cu-coated intermediate material 350a using a roller 102 such that a Cu-coated material 350b having a first thickness of more than 20 μm and less than 100 μm can be produced.

Then, in an annealing step shown in FIG. 5, annealing can be performed on the Cu-coated material 350b having the first thickness in the same manner as in the annealing step (see FIG. 3) according to the aforementioned first embodiment. Thus, a Cu-coated material 350c having a thickness (first thickness) of more than 20 μm and less than 100 μm and in which the Cu-plated layers 252 and 253 are disposed on the opposite surfaces of the iron-based alloy layer 51 can be produced.

On the other hand, in the Cu-coated material 350c annealed in the same manner as in the annealing step according to the aforementioned first embodiment, due to the influence of heating during the annealing, some of the metal elements of which the iron-based alloy plate material 151 (iron-based alloy layer 51) is made conceivably diffuse into the Cu-plated layers 252 and 253. Note that when the base layer (Ni-plated layer) is provided by Ni plating, diffusion (mainly diffusion of Ni) from the base layer into the Cu-plated layers 252 and 253 also conceivably occurs.

Consequently, in the Cu-coated material 350c, the volume resistivities of the Cu-plated layers 252 and 253 increase due to the diffused metal elements.

Then, in a rolling step next to the annealing step, cold rolling (room temperature) is performed on the annealed Cu-coated material 350c using a roller 104 in the same manner as in the aforementioned first embodiment such that a Cu-coated foil 350d having a thickness (second thickness) of 20 μm or less can be produced. At this time, rolling is performed such that the rolling reduction of the rolling roll 104 is preferably about 70% or more.

Then, in an aging treatment step shown in FIG. 5, aging treatment is performed on the Cu-coated foil 350d having a thickness (second thickness) of 20 μm or less using a heat treatment furnace 105 in the same manner as in the aforementioned first embodiment. At this time, the Cu-coated foil 350d is placed in the heat treatment furnace 105 set at a temperature of 500° C. or higher and 650° C. or lower (aging treatment temperature) and is held for 0.5 minutes or more and 3 minutes or less, which is sufficiently shorter than the holding time (about 5 minutes or more) disclosed in Japanese Patent Laid-Open No. 2008-123964. Thus, the negative electrode collector foil 205b (see FIG. 4) that the Cu-coated foil 250 constitutes, having a thickness (second thickness) of 20 μm or less, and having an elastic limit increased due to precipitation hardening can be produced. Here, in the negative electrode collector foil 205b (Cu-coated foil 250) on which the aging treatment has been performed, the influence of increases in the volume resistivities of the Cu-plated layers 252 and 253 due to the metal elements diffused into the Cu-plated layers 252 and 253 due to the influence of heating during the annealing is reduced. Thus, the volume resistivity of the negative electrode collector foil 205b is decreased to 7 μΩ·cm or less (preferably 5 μΩ·cm or less).

In the second embodiment, as shown in FIG. 5, the negative electrode collector foil 205b can be continuously produced by a roll-to-roll method. That is, the coiled negative electrode collector foil 205b can be produced using the coiled iron-based alloy plate material 151. Furthermore, the electroplating bath 301 is a so-called electroplating bath apparatus for hoop plating treatment, and both the annealing furnace 103 and the heat treatment furnace 105 are continuous furnaces. Note that the coiled negative electrode collector foil 205b is cut to a desired length when used as the negative electrode collector foil 205b of the battery 300. The aging treatment on the Cu-coated foil 350d may not be continuously performed by the roll-to-roll method as shown in FIG. 5. For example, the Cu-coated foil 350d that has undergone the annealing step and the rolling step shown in FIG. 5 is taken out, the Cu-coated foil 350d is cut to the same length as the length to be used as the negative electrode collector foil of the battery 300, and then the cut Cu-coated foil is placed in a batch-type heat treatment furnace or the cut Cu-coated foils are disposed side by side and are allowed to pass through a continuous heat treatment furnace such that the same aging treatment as described above can be performed.

Advantageous Effects of Second Embodiment

According to the second embodiment, the following advantageous effects are achieved.

According to the second embodiment, as described above, the thickness of the negative electrode collector foil 205b is 20 μm or less and the volume resistivity thereof is 7 μΩ·cm or less (preferably 5 μΩ·cm or less) such that the conductivity of the negative electrode collector foil 205b can be 24.6% IACS or more (preferably 34.5% IACS or more). Furthermore, the iron-based alloy layer 51 is made of precipitation hardened stainless steel such that the elastic limit of the iron-based alloy layer 51 can be improved by precipitation hardening through the aging treatment, and thus the elastic limit of the negative electrode collector foil 205b can be improved. Consequently, the negative electrode collector foil 205b having a thickness of 20 μm or less and having a sufficient elastic limit and sufficient conductivity can be provided.

According to the second embodiment, the pair of Cu layers are the Cu-plated layers 252 and 253 mainly made of Cu. Accordingly, the negative electrode collector foil 205b including the Cu-plated layers 252 and 253 and having a sufficient elastic limit and sufficient conductivity can be provided.

According to the second embodiment, the opposite surfaces of the iron-based alloy plate material is plated with Cu by the hoop plating treatment in which plating treatment can be continuously performed such that the Cu-plated layers 252 and 253 can be produced. Accordingly, the plating treatment and the aging treatment can be continuously performed, and thus the coiled negative electrode collector foil 205b is continuously produced such that the productivity of the negative electrode collector foil 205b can be more easily improved. The remaining advantageous effects of the second embodiment are similar to those of the first embodiment.

EXAMPLES

Experiments conducted to confirm the advantageous effects of the aforementioned first and second embodiments are now described with reference to FIG. 6.

First Example

First, a first example is described. The first example is aimed at confirming a difference in the conductivity according to the annealing temperature and the thickness of the Cu-coated intermediate material or the Cu-coated material when annealing is performed on the Cu-coated intermediate material having a thickness larger than the first thickness or the Cu-coated material having the first thickness. Specifically, a change in conductivity in the case in which annealing is performed on a Cu-coated intermediate material having a thickness of 150 μm, which is larger than the first thickness, at different annealing temperatures, and a change in conductivity in the case in which annealing is performed on a Cu-coated material having a thickness of 50 μm, which is in the range of the first thickness, at different annealing temperatures were measured.

(Production of Cu-Coated Intermediate Material of Test Material 1)

First, a Cu-coated intermediate material of a test material 1 (test materials 1a to 1e) was produced based on the manufacturing method according to the aforementioned first embodiment. Specifically, an iron-based alloy plate material made of SUS631, which is precipitation hardened stainless steel, and a pair of Cu plate materials made of oxygen-free copper of C1020 (in compliance with JIS H0500) were prepared. The thickness (average thickness) of the iron-based alloy plate material is 0.45 mm, and the thicknesses (average thicknesses) of the pair of Cu plate materials are 0.15 mm. The ratio of the thicknesses of the respective plate materials (the thickness of the Cu plate material: the thickness of the iron-based alloy plate material: the thickness of the Cu plate material) is "1:3:1".

Then, in a state in which the iron-based alloy plate material was sandwiched between the pair of Cu plate materials in a thickness direction, cold roll-bonding (room temperature) was performed using a roller such that the pair of Cu plate materials were respectively bonded onto opposite surfaces of the iron-based alloy plate material to produce a Cu-coated intermediate material having a thickness of 0.3 mm. Thereafter, the Cu-coated intermediate material was cold-rolled (room temperature) using a roller to produce a Cu-coated intermediate material having a thickness of 150 μm of the test material 1 (test materials 1a to 1e). In the Cu-coated intermediate material of the test material 1, the thickness of the iron-based alloy layer 51 is 90 μm, and the thickness of each of the pair of Cu layers bonded onto the opposite surfaces of the iron-based alloy layer 51 is 30 μm. The ratio of the thickness of each plate material in the Cu-coated intermediate material (the thickness of the Cu plate material: the thickness of the iron-based alloy plate material: the thickness of the Cu plate material) is about "1:3:1".

Then, annealing (diffusion annealing) was performed on the produced Cu-coated intermediate materials having a thickness of 150 μm of a plurality of test materials 1a to 1e at different holding temperatures. Specifically, the test material 1b was annealed at a temperature of 900° C. for 1 minute. The test material 1c was annealed at a temperature of 950° C. for 1 minute. The test material 1d was annealed at a temperature of 1000° C. for 1 minute. The test material 1e was annealed at a temperature of 1050° C. for 1 minute. Then, the volume resistivity of each of the test materials 1b to 1e after the annealing was measured in compliance with JIS-C2525: 1999. The test material 1a was not annealed, and the volume resistivity thereof was measured in the same manner as those for the test materials 1b to 1e. Then, the conductivity was calculated from the volume resistivity. Furthermore, the Vickers hardness of the iron-based alloy layer in the Cu-coated intermediate material of each of the test materials 1a to 1e was measured using a Vickers hardness measuring instrument (not shown). The Vickers hardness is believed to correspond to the elastic limit stress $\sigma_{0.01}$ (positive correlation), and as the Vickers hardness of the material increases, the elastic limit stress $\sigma_{0.01}$ also increases.

(Production of Cu-Coated Material of Test Material 2)

Next, a Cu-coated material of a test material 2 (test materials 2a to 2f) was produced. Specifically, annealing (diffusion annealing) was performed on a Cu-coated intermediate material having a thickness of 150 μm of the test material 1 at a temperature of 900° C. for 1 minute, and thereafter cold rolling (room temperature) was performed using a roller to produce a Cu-coated material having a thickness (first thickness) of 50 μm of the test material 2 (test materials 2a to 2f). That is, the test material 2 having a thickness of 50 μm, which is ⅓ of the thickness (150 μm) of the Cu-coated material of the test material 1, was produced. In the Cu-coated material of the test material 2, the thickness of the iron-based alloy layer 51 is 30 μm, and the thickness of each of the pair of Cu layers bonded onto the opposite surfaces of the iron-based alloy layer 51 is 10 μm. The ratio of the thicknesses of the respective layers in the Cu-coated material (the thickness of the Cu layer: the thickness of the iron-based alloy layer 51: the thickness of the Cu layer) is about "1:3:1".

Then, annealing (softening annealing) was performed on the produced Cu-coated materials having a thickness of 50 μm of a plurality of test materials 2a to 2f at different holding temperatures. Specifically, the test material 2b was annealed at a temperature of 850° C. for 1 minute. The test material 2c was annealed at a temperature of 900° C. for 1 minute. The test material 2d was annealed at a temperature of 950° C. for 1 minute. The test material 2e was annealed at a temperature of 1000° C. for 1 minute. The test material 2f was annealed at a temperature of 1050° C. for 1 minute. Then, the volume resistivity of each of the test materials 2b to 2f after the annealing was measured in compliance with JIS-C2525: 1999. The test material 2a was not annealed, and the volume resistivity thereof was measured in the same manner as those for the test materials 2b to 2f. Then, the conductivity was calculated from the volume resistivity. Furthermore, the Vickers hardness of the iron-based alloy layer in the Cu-coated material of each of the test materials 2a to 2f was measured.

(Measurement Results)

The measurement results of the test material 1 and the measurement results of the test material 2 are shown in Table 1 and Table 2, respectively. The "annealing temperature" in each table is a holding temperature during the annealing.

TABLE 1

|  | ANNEALING TEMPERATURE (° C.) | VOLUME RESISTIVITY (×μΩ · cm) | CONDUCTIVITY (% IACS) | HARDNESS OF IRON-BASED ALLOY LAYER (HV) |
| --- | --- | --- | --- | --- |
| TEST MATERIAL 1a | N/A | 4.20 | 41.1 | 548 |
| TEST MATERIAL 1b | 900 | 4.38 | 39.4 | 291 |
| TEST MATERIAL 1c | 950 | 4.60 | 37.5 | 250 |
| TEST MATERIAL 1d | 1000 | 4.96 | 34.8 | 226 |
| TEST MATERIAL 1e | 1050 | 5.40 | 31.9 | 211 |

THICKNESS OF TEST MATERIAL: 150 μm

TABLE 2

|  | ANNEALING TEMPERATURE (° C.) | VOLUME RESISTIVITY (×μΩ · cm) | CONDUCTIVITY (% IACS) | HARDNESS OF IRON-BASED ALLOY LAYER (HV) |
| --- | --- | --- | --- | --- |
| TEST MATERIAL 2a | N/A | 4.35 | 39.6 | 562 |
| TEST MATERIAL 2b | 850 | 4.75 | 36.3 | 354 |

TABLE 2-continued

|  | ANNEALING TEMPERATURE (° C.) | VOLUME RESISTIVITY (×μΩ·cm) | CONDUCTIVITY (% IACS) | HARDNESS OF IRON-BASED ALLOY LAYER (HV) |
|---|---|---|---|---|
| TEST MATERIAL 2c | 900 | 4.98 | 34.6 | 328 |
| TEST MATERIAL 2d | 950 | 5.96 | 28.9 | 302 |
| TEST MATERIAL 2e | 1000 | 7.84 | 22.0 | 257 |
| TEST MATERIAL 2f | 1050 | 10.31 | 16.7 | 194 |

THICKNESS OF TEST MATERIAL: 50 μm

As the measurement results, the Vickers hardness decreased as the holding temperature during the annealing increased in both the test materials 1 and 2. This indicates that the precipitation hardened stainless steel is softened due to the influence of heating during the annealing.

In both the test materials 1 and 2, the volume resistivity increased and the conductivity decreased as the holding temperature during the annealing increased. This is conceivably because one or more of Al, Cr, Fe, and Ni, which are the metal elements of which the iron-based alloy layer is made, diffused into the Cu layers that contribute mainly to conductivity in the Cu-coated intermediate material and the Cu-coated material. Furthermore, as the holding temperature during the annealing increased, the rate of increase in volume resistivity and the rate of decrease in conductivity to the non-annealed test material (test material 1a or 2a) increased. This is conceivably because the total amount (diffusion amount) and the diffusion distance of the above metal elements believed to have been diffused increased as the holding temperature during the annealing increased.

In the test material 1 having a thickness of 150 μm, the rate of increase in volume resistivity and the rate of decrease in conductivity to the non-annealed test material 1a were not so large. For example, in the test material 1b annealed at 900° C., the rate of increase in volume resistivity was 4.3% (=((4.38/4.20)×100)−100) as compared with the non-annealed test material 1a. In addition, in the test material 1e annealed at 1050° C., the rate of increase in volume resistivity was 12.9% (=((5.40/4.20)×100)−100) as compared with the non-annealed test material 1a.

On the other hand, in the test material 2 having a thickness of 50 μm, the rate of increase in volume resistivity and the rate of decrease in conductivity to the non-annealed test material 2a increased, as compared with the test material 1. For example, in the test material 2c annealed at 900° C., the rate of increase in volume resistivity was 14.5% (=((4.98/4.35)×100)−100) as compared with the non-annealed test material 2a. In addition, in the test material 2f annealed at 1050° C., the rate of increase in volume resistivity was 137.0% (=((10.31/4.35)×100)−100) as compared with the non-annealed test material 2a.

This is conceivably because the diffusion amount and diffusion distance of the above metal elements believed to have been diffused depends on the holding temperature during the annealing. That is, in the test material 1 in which the Cu layers each have a large thickness of 30 μm, even when the above metal elements diffuse into portions of the Cu layers in the vicinity of the iron-based alloy layer, the above metal elements do not sufficiently diffuse to the vicinities of the surfaces of the Cu layers (positions away from the iron-based alloy layer). On the other hand, in the test material 2 in which the Cu layers each have a small thickness of 10 μm, the above metal elements diffuse not only into portions of the Cu layers in the vicinity of the iron-based alloy layer but also to the vicinities of the surfaces of the Cu layers (positions away from the iron-based alloy layer). Thus, it is believed that in the test material 2, the rate of increase in volume resistivity and the rate of decrease in conductivity to the non-annealed test material 2a increased as compared with the test material 1. Consequently, it has been found that in the case in which the clad material having a thickness of 0.1 mm or more, which is disclosed in Japanese Patent Laid-Open No. 2008-123964, is thinned to 20 μm or less, the volume resistivities of the Cu layers increase when the clad material is influenced by heating during the annealing while the clad material has a thickness of more than 20 μm and 0.1 mm or less. Therefore, it is believed that the clad material having a large thickness of 0.1 mm or more, which is disclosed in Japanese Patent Laid-Open No. 2008-123964, has been only rolled so as not to increase the volume resistivities of the Cu layers, and annealing for facilitating rolling has not been performed thereon. Therefore, in order to roll the clad material having a large thickness of 0.1 mm or more, which is disclosed in Japanese Patent Laid-Open No. 2008-123964, to a thickness of 20 μm or less to be used as a foil for a negative electrode collector, it is necessary to ensure sufficient rolling properties such that rolling can be continued by performing appropriate annealing (softening annealing) while the thickness of the clad material changes from 0.1 mm or more to 20 μm or less even when work-hardening caused by rolling occurs. In addition to that, it has been found that it is necessary to optimize the conditions of annealing and aging treatment to be performed on the clad material having a thickness of 0.1 mm or more to 20 μm or less. In other words, it has been found that it is difficult to decrease the volume resistivity of the negative electrode collector foil to a sufficiently small volume resistivity of 7 μΩ·cm or less (preferably 5 μΩ·cm or less) merely by decreasing the thickness of the clad material.

In addition, in has been found that annealing at a holding temperature in a low temperature range of 850° C. or higher and 1050° C. or lower is performed on the test materials 1 and 2 rather than annealing at a holding temperature in a high temperature range of higher than 1050° C. to be generally performed on precipitation hardened stainless steel such that the Vickers hardness can be decreased while increases in the volume resistivities of the test materials 1 and 2 are significantly reduced or prevented. In order to significantly reduce or prevent increases in the volume resistivities while sufficiently reducing the Vickers hardness in the Cu-coated intermediate material of the test material 1 and the Cu-coated material of the test material 2, it is believed that the holding temperature during the annealing is preferably 930° C. or higher and 980° C. or lower.

Second Example

Next, a second example is described. The second example is aimed at confirming a difference in the elastic limit according to the rolling reduction and the aging treatment in precipitation hardened stainless steel. Specifically, a change in the mechanical strength (Vickers hardness) of precipitation hardened stainless steel was measured when the rolling reduction and the conditions of the aging treatment were varied. As described above, the Vickers hardness is believed to correspond to the elastic limit stress $\sigma_{0.01}$ (positive correlation), and thus it is possible to estimate the relative magnitude (degree) of the elastic limit stress $\sigma_{0.01}$ indirectly from the Vickers hardness.

First, an iron-based alloy plate material made of SUS631, which is precipitation hardened stainless steel, and having a thickness of 1 mm was prepared. Then, the iron-based alloy plate material was annealed at 1050° C. for 2 minutes to produce a test intermediate material made of precipitation hardened stainless steel.

Then, the produced test intermediate material made of precipitation hardened stainless steel was rolled at a predetermined rolling reduction to produce test materials 3 to 6. Specifically, the test intermediate material made of precipitation hardened stainless steel was rolled at rolling reductions of 60%, 70%, 80%, and 85% to produce the test materials 3 to 6, respectively. Then, aging treatment was performed to hold each of the test materials 3 to 6 at an aging treatment temperature for a holding time shown in the following Table 3. Then, the Vickers hardness of each of the test materials 3 to 6 on which the aging treatment had been performed was measured.

(Measurement Results)

Figure 6:
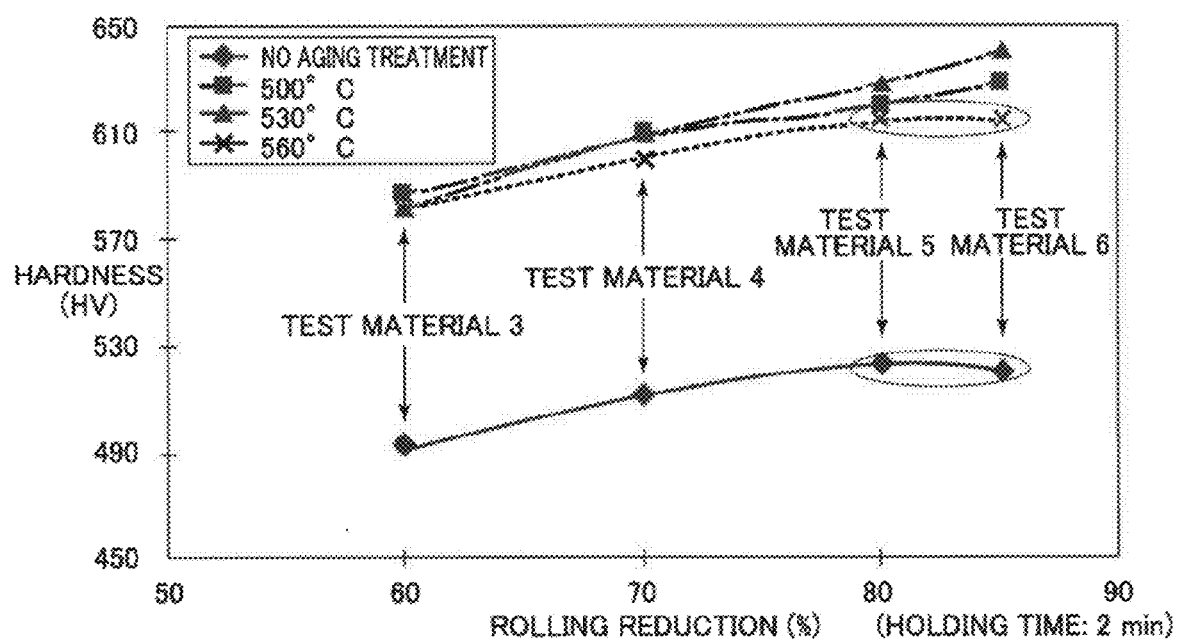
FIG. 6 A graph showing the hardness of precipitation hardened stainless steel with respect to the rolling reduction when the aging treatment temperature is different.

The measurement results of the test materials 3 to 6 are shown in Table 3 and FIG. 6. FIG. 6 shows the relationship between the rolling reduction and the Vickers hardness when the holding time of the aging treatment is 2 minutes.

TABLE 3

| | ROLLING REDUCTION (%) | AGING TREATMENT (° C.) | HOLDING TIME (min) | HARDNESS (HV) |
|---|---|---|---|---|
| TEST MATERIAL 3a | 60 | N/A | N/A | 491 |
| TEST MATERIAL 3b | 60 | 500 | 2 | 587 |
| TEST MATERIAL 3c | 60 | 530 | 2 | 583 |
| TEST MATERIAL 3d | 60 | 560 | 2 | 582 |
| TEST MATERIAL 4a | 70 | N/A | N/A | 511 |
| TEST MATERIAL 4b | 70 | 500 | 2 | 610 |
| TEST MATERIAL 4c | 70 | 530 | 2 | 610 |
| TEST MATERIAL 4d | 70 | 560 | 2 | 601 |
| TEST MATERIAL 5a | 80 | N/A | N/A | 523 |
| TEST MATERIAL 5b | 80 | 500 | 2 | 621 |
| TEST MATERIAL 5c | 80 | 530 | 1 | 615 |
| TEST MATERIAL 5d | 80 | 530 | 2 | 629 |
| TEST MATERIAL 5e | 80 | 530 | 3 | 627 |
| TEST MATERIAL 5f | 80 | 560 | 2 | 616 |
| TEST MATERIAL 5g | 80 | 480 | 5 | 556 |
| TEST MATERIAL 5h | 80 | 480 | 10 | 588 |
| TEST MATERIAL 5i | 80 | 480 | 20 | 598 |
| TEST MATERIAL 5j | 80 | 480 | 40 | 634 |
| TEST MATERIAL 5k | 80 | 480 | 60 | 631 |
| TEST MATERIAL 5l | 80 | 480 | 90 | 598 |
| TEST MATERIAL 6a | 85 | N/A | N/A | 521 |
| TEST MATERIAL 6b | 85 | 500 | 2 | 629 |
| TEST MATERIAL 6c | 85 | 530 | 2 | 642 |
| TEST MATERIAL 6d | 85 | 560 | 2 | 615 |

As the measurement results, the mechanical strength (Vickers hardness) tended to increase as the rolling reduction was increased to 60% (test material 3), 70% (test material 4), 80% (test material 5), and 85% (test material 6), as shown in FIG. 6. Furthermore, it has been found that the Vickers hardness can be further increased as in the test materials 4 to 6 by rolling precipitation hardened stainless steel at a larger rolling reduction of about 70% to 85% rather than by rolling the same at a rolling reduction of about 40% to 60% at which rolling is generally performed. Therefore, it has been found that the elastic limit stress $\sigma_{0.01}$, which increases as the Vickers hardness increases, can also be further increased. Consequently, it has been confirmable that when the iron-based alloy layer made of precipitation hardened stainless steel is rolled so as to make the thickness of the iron-based alloy layer smaller when the negative electrode collector foil is produced, the rolling reduction before the above aging treatment for the iron-based alloy layer is set to 70% or more such that the elastic limit of the rolled iron-based alloy layer, the thickness of which has been further decreased, after the above aging treatment can be effectively improved. Furthermore, it has been found that the rolling reduction before the above aging treatment for the iron-based alloy layer made of precipitation hardened stainless steel is set to 80% or more such that the elastic limit of the iron-based alloy layer after the above aging treatment can be more effectively improved.

In addition, as shown in Table 3 and FIG. 6, in the case in which the holding time of the aging treatment was 2 minutes, the Vickers hardness hardly increased when the aging treatment temperature was 560° C. and the rolling reduction was 80% or more (regions of the test materials 5 and 6 surrounded by a solid line and shown in an upper portion of FIG. 6) similarly to when the aging treatment was not performed and the rolling reduction was 80% or more (regions of the test materials 5 and 6 surrounded by a solid line and shown in a lower portion of FIG. 6). This is conceivably because precipitation hardening occurred through the aging treatment and the influence of heating occurred such that the effect of an increase in the elastic limit stress due to the precipitation hardening of the precipitation hardened stainless steel was canceled out. On the other hand, when the aging treatment temperature was 550° C. or less (530° C., 500° C.), the Vickers hardness increased even when the rolling reduction was 80% or more (test materials 5 and 6). This is conceivably because in the precipitation hardened stainless steel, precipitation hardening occurred while the influence of heating due to the aging treatment was reduced. Thus, when the holding time of the aging treatment is 2 minutes, it is conceivably preferable to hold the precipitation hardened stainless steel at an aging treatment temperature of 500° C. or higher and 550° C. or lower. It is believed that when the holding time of the aging treatment is 0.5 minutes or more and less than 2 minutes, the elastic limit can be improved by precipitation-hardening the precipitation hardened stainless steel while reducing the influence of heating even when it is held at an aging treatment temperature of higher than 550° C. and 650° C. or lower. Furthermore, it is believed that when it is held at an aging treatment temperature of 500° C. or higher and 530° C. or lower, the influence of heating can be reduced if the holding time is about 3 minutes.

In addition, when the precipitation hardened stainless steel disclosed in Japanese Patent Laid-Open No. 2008-123964 was held at an aging treatment temperature of lower than 500° C. (480° C.) as in the test materials 5g to 5l, the rate of increase in Vickers hardness to the test material 5a, on which no aging treatment had been performed, decreased to about 6% even when the holding time was 5 minutes. In addition, in the test material 5 having a rolling reduction of 80%, it is necessary to set the holding time to at least more than 20 minutes (test material 5i) in order to obtain Vickers hardness substantially equal to that of the test material 5b (500° C., 2 minutes) when the precipitation hardened stainless steel is held at an aging treatment temperature of lower than 500° C. (480° C.). Thus, it has been found that aging treatment in which holding is performed at an aging treatment temperature of 480° C. is insufficient in order to perform aging treatment continuously (efficiently). Thus, it has been confirmable that it is necessary to perform the above aging treatment in which holding is performed at an aging treatment temperature of 500° C. or higher in order to improve the productivity of the negative electrode collector foil.

When aging treatment in which precipitation hardened stainless steel is held at an aging treatment temperature of 530° C. was performed as in the test materials 5c to 5e, a certain level of Vickers hardness was obtained even when the holding time was 1 minute (test material 5c). Therefore, it is believed that when the holding time of the above aging treatment is further reduced (1 minute or less, for example), the precipitation hardened stainless steel can be more effectively precipitation-hardened by setting the aging treatment temperature to 530° C. or higher. Note that it is conceivably preferable to reduce the holding time of the above aging treatment to such an extent that the influence of heating is further reduced in order to obtain an iron-based alloy layer having a higher strength (elastic limit stress $\sigma_{0.01}$).

Third Example

Next, a third example is described. The third example is aimed at confirming that a foil for a negative electrode collector (negative electrode collector foil) of a secondary battery having a second thickness of 20 μm or less and having a sufficient elastic limit and sufficient conductivity can be actually produced based on the manufacturing method according to the present invention. Specifically, a negative electrode collector foil (Cu-coated foil) having a thickness of 20 μm or less was actually produced based on the manufacturing method according to the aforementioned first embodiment, and the volume resistivity and mechanical strength (tensile strength and elastic limit stress $\sigma_{0.01}$) of the Cu-coated foil were measured.

(Production of Cu-Coated Foil of Example)

First, a Cu-coated foil 50 (negative electrode collector foil 5b) of Example was produced based on the manufacturing method according to the aforementioned first embodiment. Specifically, annealing (softening annealing) was performed on the above test material 2, which is a Cu-coated material having a thickness (first thickness) of 50 μm, at a temperature of 900° C. for 1 minute. Thereafter, rolling was performed at a rolling reduction of 80% to produce a Cu-coated foil having a thickness of 10 μm (second thickness) before aging treatment. Then, the aging treatment was performed on the Cu-coated foil having a thickness of 10 μm at an aging treatment temperature of 530° C. for a holding time of 2 minutes to produce the Cu-coated foil 50 of Example. In addition, a Cu-coated foil having a thickness of 10 μm and on which no aging treatment had been performed was used as Comparative Example.

Using a tensile tester, the tensile strength and elastic limit stress $\sigma_{0.01}$ of each of the Cu-coated foils of Example and Comparative Example were measured. In addition, the volume resistivity of each of the Cu-coated foils of Example and Comparative Example was measured in compliance with JIS-C2525: 1999. From this volume resistivity, the conductivity of each of the Cu-coated foils of Example and Comparative Example was acquired.

(Measurement Results)

The measurement results of Example and Comparative Example are shown in Table 4. The "aging treatment temperature" described in Table 4 is a holding temperature during the aging treatment.

TABLE 4

| | AGING TREATMENT (AGING TREATMENT TEMPERATURE, HOLDING TIME) | TENSILE STRENGTH (MPa) | ELASTIC LIMIT STRESS $\sigma_{0.01}$ (MPa) | VOLUME RESISTIVITY (×μΩ·cm) | CONDUCTIVITY (% IACS) |
|---|---|---|---|---|---|
| COMPARATIVE EXAMPLE | N/A | 819 | 663 | 5.1 | 33.8 |
| EXAMPLE | 530° C. 2 min | 761 | 761 | 4.8 | 35.9 |

As the measurement results, the Cu-coated foil of Example was broken under elastic deformation without plastic deformation. That is, the tensile strength and the elastic limit stress $\sigma_{0.01}$ were equal to each other in the Cu-coated foil of Example on which the aging treatment had been performed. This is conceivably because in the Cu-coated foil of Example, precipitation hardening occurred due to the aging treatment such that plastic deformation hardly occurred, and the elastic limit was improved. In the Cu-coated foil of Example, the tensile strength became smaller, but the elastic limit stress $\sigma_{0.01}$ was increased by about 15%, as compared with the Cu-coated foil of Comparative Example on which no aging treatment had been performed. In the Cu-coated foil of Example, the elastic limit stress $\sigma_{0.01}$ was 761 MPa more than 700 MPa. Thus, it has been confirmable that wrinkle-like irregularities due to plastic deformation are less likely to occur in the Cu-coated foil of Example.

The volume resistivity of the Cu-coated foil of Example was decreased by about 6% as compared with that of the Cu-coated foil of Comparative Example before the aging treatment. Furthermore, the volume resistivity of the Cu-coated foil of Example became 4.8 μΩ·cm less than 7 μΩ·cm. Thus, it has been found that even when the metal elements of which the iron-based alloy layer is made diffuse into the Cu layers due to the annealing at a high temperature, the above aging treatment is performed such that the volume resistivities of the Cu layers can be sufficiently decreased, and thus the volume resistivity of the negative electrode collector foil can be decreased to 5 μΩ·cm or less (4.8 μΩ·cm), which is even smaller than 7 μΩ·cm. This is conceivably because in the above aging treatment, the metal elements that had diffused into the Cu layers probably became precipitates in the Cu layers such that the conductivity of the Cu layers, which had decreased, was restored. Therefore, it is believed that the volume resistivities of the Cu layers in the Cu-coated foil became smaller due to the above aging treatment.

When the Cu-coated material having a thickness (first thickness) of about 50 μm is annealed (diffusion-annealed) at a temperature of about 1050° C. and is rolled into a Cu-coated foil having a thickness (second thickness) of about 10 μm, the volume resistivity of the Cu-coated foil before the aging treatment is about 10.6 μΩ·cm. It has been found that when aging treatment is then performed at a temperature of about 580° C. for a holding time of about 2 minutes, for example, as short-time aging treatment (aging treatment at a temperature of 500° C. or higher and 650° C. or lower for a holding time of 0.5 minutes or more and 3 minutes or less) in which the holding time is sufficiently shorter than a holding time of about 5 minutes to about 180 minutes in the aging treatment disclosed in Japanese Patent Laid-Open No. 2008-123964, the volume resistivity of the Cu-coated foil after the aging treatment is about 8.2 μΩ·cm and considerably decreases. The phenomenon that the volume resistivity of the Cu-coated foil decreases due to the above short-time aging treatment is not attributable to measurement variation in volume resistivity or the like but is a phenomenon clearly developed by the short-time aging treatment.

In quantitative analysis by EDX (Energy Dispersive X-ray Spectroscopy) in portions of the Cu layers in the vicinity of the iron-based alloy layer, about 3.0% of Fe, about 0.6% of Cr, and about 0.1% of Al in mass ratio were detected. Thus, it has been found that diffusion of the metal elements contained in the iron-based alloy layer into the Cu layers causes an increase in the volume resistivity of the Cu-coated foil.

In the Cu-coated foil of Example described above, the Cu-coated material having a first thickness of more than 20 μm before rolling to a second thickness of 20 μm or less is annealed at a holding temperature of 900° C. However, it is believed that even when the Cu-coated material is annealed at a holding temperature of 1050° C. or less such that the volume resistivity of the Cu-coated foil having the second thickness increases after the rolling, the above short-time aging treatment is performed on the Cu-coated foil having the second thickness such that the volume resistivities of the Cu layers of the Cu-coated foil can be sufficiently decreased, and the volume resistivity of the negative electrode collector foil can be decreased to 7 μΩ·cm or less and further decreased to 5 μΩ·cm or less. It is believed that even when the Cu-coated material having a first thickness of more than 20 μm is rolled to a second thickness of 20 μm or less after annealing at a holding temperature of 1000° C. or lower, the above short-time aging treatment is performed such that the volume resistivity of the negative electrode collector foil can be reliably decreased to 5 μΩ·cm or less (4.8 μΩ·cm). On the other hand, when the Cu-coated foil having the second thickness is annealed at a holding temperature of higher than 1050° C., there is a possibility that an increase in the volume resistivity of the Cu-coated foil caused by diffusion of the metal elements from the iron-based alloy layer becomes excessive. When an increase in the volume resistivity of the Cu-coated foil becomes excessive, there is a possibility that the effect of restoring the volume resistivity by the above aging treatment is not sufficiently obtained, and thus the volume resistivity of the negative electrode collector foil cannot be sufficiently decreased.

Fourth Example

Next, a fourth example is described. The fourth example is aimed at confirming a change in volume resistivity due to a difference in aging treatment temperature. Specifically, Cu-coated materials each having a first thickness of 50 μm with different aging treatment temperatures were produced based on the manufacturing method according to the aforementioned first embodiment, and the volume resistivities thereof were measured. Then, SEM images of the Cu-coated materials were captured to confirm precipitates, and elemental analysis of the precipitates was performed.

(Production of Cu-Coated Material of Test Material 6)

First, a Cu-coated material of the test material 6 (test materials 6a to 6g) was produced based on the manufacturing method according to the aforementioned first embodiment. Specifically, the test material 1e of the first example, which had been annealed at a temperature of 1050° C. for a holding time of 1 minute, was cold-rolled (room temperature) using a roller to produce a Cu-coated material of the test material 6 having a first thickness of 50 μm. In the Cu-coated material of the test material 6, the thickness of an iron-based alloy layer 51 is 30 μm, and the thickness of each of a pair of Cu layers bonded to opposite surfaces of the iron-based alloy layer is 10 μm. The ratio of the thicknesses of the respective layers in the Cu-coated material of the test material 6 (the thickness of the Cu layer: the thickness of the iron-based alloy layer 51: the thickness of the Cu layer) is "1:3:1".

Then, using a plurality of Cu-coated materials of the test material 6 each having a thickness of 50 μm, a Cu-coated material of the test material 6a on which no aging treatment had been performed and Cu-coated materials of the test materials 6b to 6g on which aging treatment had been performed at different aging treatment temperatures for a holding time of 2 minutes were produced. The specific aging treatment temperatures were 450° C., 500° C., 550° C., 575° C., 600° C., and 650° C. for the test materials 6b, 6c, 6d, 6e, 6f, and 6g, respectively. The aging treatment was performed in a hydrogen atmosphere.

(Volume Resistivities)

Then, in compliance with JIS-C2525: 1999, the volume resistivities of the Cu-coated materials of the test materials 6a to 6g were measured.

(Measurement Results of Volume Resistivities)

Figure 7:
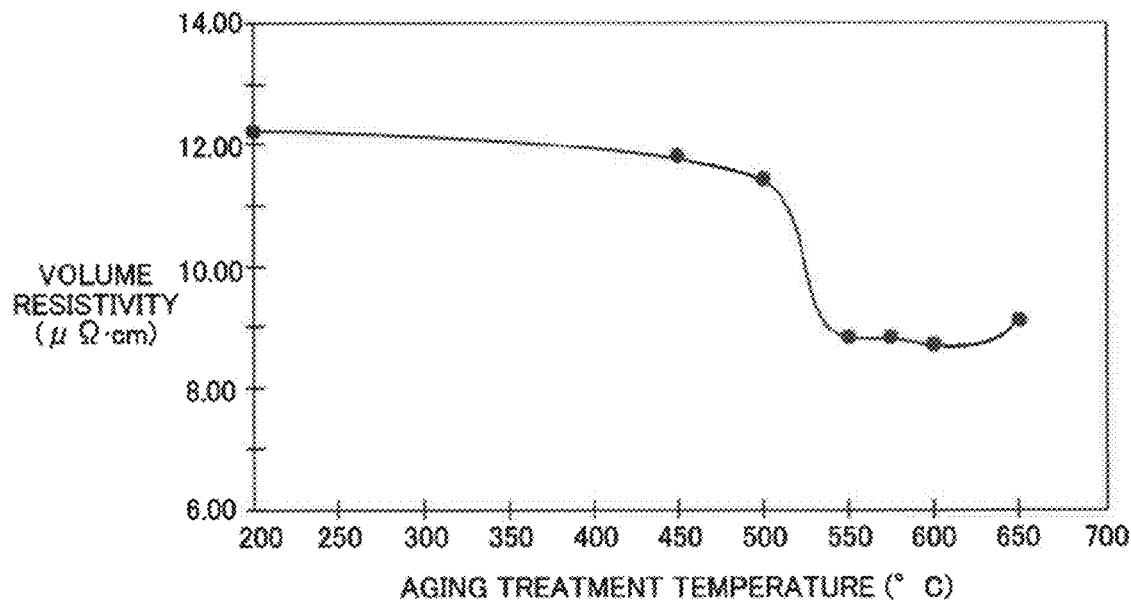
FIG. 7 A graph showing the volume resistivity when the aging treatment temperature is different.

The measurement results of the test materials 6a to 6g are shown in Table 5 and FIG. 7. The "aging treatment temperature" described in Table 5 and FIG. 7 is a holding temperature during the aging treatment.

TABLE 5

| | AGING TREATMENT TEMPERATURE (° C.) | VOLUME RESISTIVITY (μΩ · cm) |
|---|---|---|
| TEST MATERIAL 6a | N/A | 12.2 |
| TEST MATERIAL 6b | 450 | 11.7 |
| TEST MATERIAL 6c | 500 | 11.3 |
| TEST MATERIAL 6d | 550 | 8.8 |
| TEST MATERIAL 6e | 575 | 8.8 |
| TEST MATERIAL 6f | 600 | 8.7 |
| TEST MATERIAL 6g | 650 | 9.1 |

As the measurement results, it has been confirmable that the volume resistivity of the test material 6 is decreased in the temperature range of an aging treatment temperature of 500° C. to 650° C. Consequently, it has been confirmable that the aging treatment is performed at an aging treatment temperature of 500° C. or higher and 650° C. or lower such that the volume resistivity increased due to annealing can be decreased. In particular, it has been confirmable that the volume resistivity can be considerably decreased in the range of an aging treatment temperature of 520° C. or higher (preferably 550° C. or higher). The test material 6 had a thickness of 50 μm, and thus the volume resistivity after the aging treatment exceeded 7 μΩ·cm, but it is believed that in a Cu-coated foil having a thickness of 20 μm or less, the volume resistivity can be set to 7 μΩ·cm or less due to the above aging treatment.

(SEM Images)

Next, a cross-section around a bonding interface between an iron-based alloy layer and a Cu layer in the test material 6a on which no aging treatment had been performed and a cross-section around a bonding interface between an iron-based alloy layer and a Cu layer in the test material 6e on which aging treatment had been performed at an aging treatment temperature of 575° C. were observed using a scanning electron microscope (SEM).

(Observation Results of SEM Images)

Figure 8:
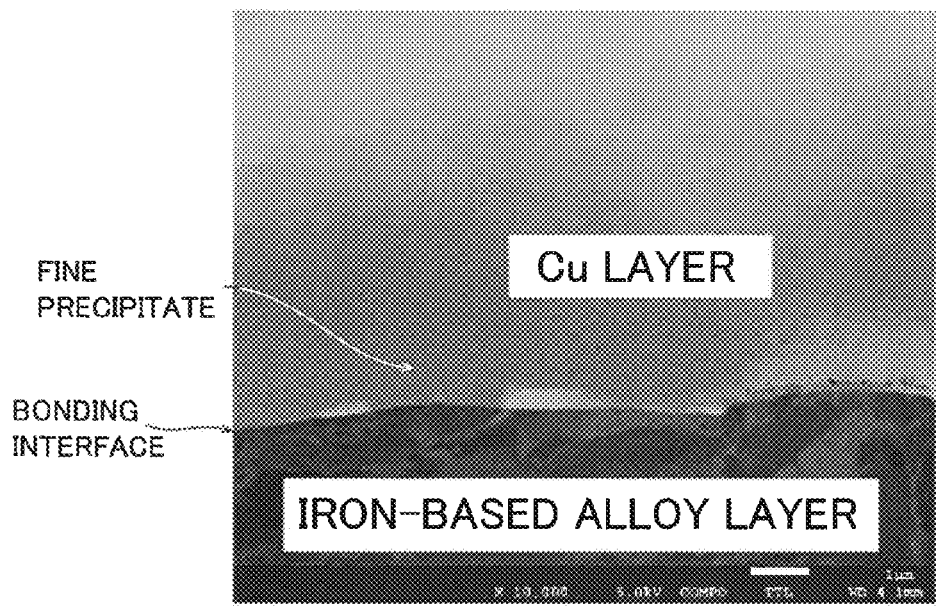
FIG. 8 A photograph showing an SEM image of a test material 6a before aging treatment.
Figure 9:
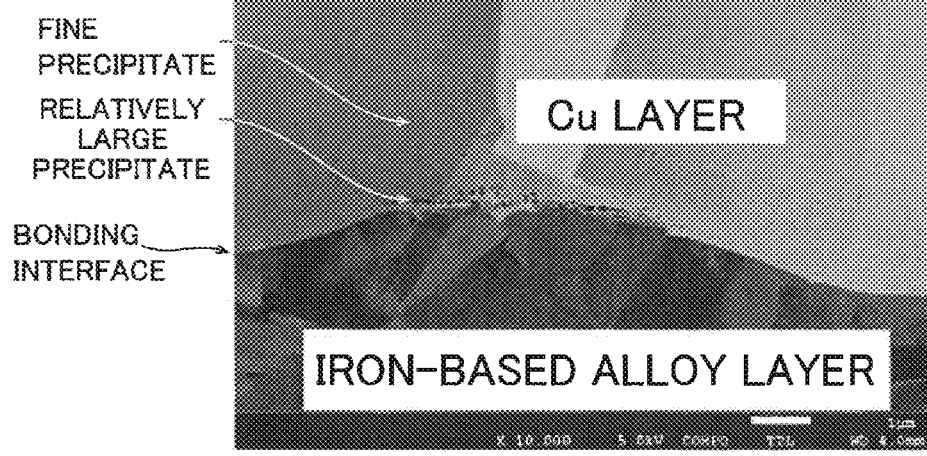
FIG. 9 A photograph showing an SEM image of a test material 6e after aging treatment.

In SEM images of the test materials 6a and 6e shown in FIGS. 8 and 9, precipitates of 1 μm or less were observed in the Cu layers of the test materials 6a and 6e before and after the aging treatment. Among these precipitates, fine precipitates of 100 nm or less were observed over substantially the entire Cu layers, but precipitates in the test material 6e on which the above aging treatment had been performed further grew and became larger. On the other hand, relatively large precipitates of about 200 nm or more were mainly observed in the vicinity of the bonding interface of the Cu layer of the test material 6e on which the above aging treatment had been performed.

(Elemental Analysis)

Next, elemental analysis was performed on the cross-section of the Cu layer of the test material 6e after the aging treatment using an energy dispersive X-ray analyzer (EDX) and an electron probe microanalyzer (EPMA). Specifically, at the upper position of 2 μm from the surface 52a of the Cu layer 52 toward the iron-based alloy layer 51 and the lower position of 2 μm in a direction away from the iron-based alloy layer 51 from the bonding interface between the iron-based alloy layer 51 and the Cu layer 52, the contents of elements in the Cu layer were measured using the EDX. The range of measurement by the EDX is within a circle with a diameter of 1 μm, the center of which is located at the above upper position (the position close to the surface 52a of the Cu layer 52) and a circle with a diameter of 1 μm, the center of which is located at the above lower position (the position close to the bonding interface between the iron-based alloy layer 51 and the Cu layer 52). The results of measurement by the EDX are shown in Table 6. In addition, FIG. 10 shows an enlarged photograph showing a precipitate in the SEM image, and FIG. 11 shows a photograph of an EPMA image at the same image-capturing position as the image-capturing position in FIG. 10.

TABLE 6

|  | Fe | Cr | Ni | Cu | Al | Si | O |
|---|---|---|---|---|---|---|---|
| UPPER POSITION | 1.1 | 0.2 | 0.2 | 98.5 | 0.1 | — | — |
| LOWER POSITION | 3.6 | 0.6 | 0.8 | 94.9 | 0.1 | — | — |

(mass %)

(Results of Elemental Analysis)

As the results of elemental analysis by the EDX, it has been confirmable that one or more metal elements among Fe, Cr, Ni, and Al derived from the iron-based alloy of the iron-based alloy layer 51 diffuse in a wide range of the Cu layer. Specifically, the diffusion of the metal elements could be observed not only at the lower position close to the bonding interface but also at the upper position far from the bonding interface. The contents of the metal elements at the lower position close to the bonding interface are larger than the contents of the metal elements at the upper position far from the bonding interface, and thus large precipitates conceivably tend to be precipitated in the Cu layer in the vicinity of the bonding interface.

Furthermore, from the SEM image shown in FIG. 10 and the EPMA image shown in FIG. 11, it has been found that a large amount of Al is contained in a relatively large precipitate of about 200 nm precipitated in the Cu layer in the vicinity of the bonding interface. Consequently, the large precipitate after the above aging treatment is believed to be a precipitate that contains at least Al. The fine precipitates of 100 nm or less precipitated over a wide range of the cross-section are believed to be probably precipitates that contain Fe or Cr or precipitates that contain both Fe and Cr.

From the results of the fourth example, it has been found that in the Cu-coated material having a first thickness of 50 μm or less or the Cu-coated foil having a second thickness of 20 μm or less, the elements contained in the precipitation hardened stainless steel of the iron-based alloy layer diffuse into the Cu layer due to the annealing such that the volume resistivity considerably increases. However, due to the aging treatment performed in an appropriate temperature range, the precipitates that have been precipitated in the Cu layer during cooling after the annealing become nuclei and the once diffused metal elements precipitate and grow on the precipitates, or new precipitates are formed such that the concentrations of impurities (diffused metal elements) solid-dissolved in a Cu base in the Cu layer can be decreased. Consequently, it is believed that the volume resistivity can be decreased in the Cu-coated material having a first thickness of 50 μm or less or the Cu-coated foil having a second thickness of 20 μm or less.

In the first to fourth examples, the experiments have been conducted in the case in which the test materials, Example, and Comparative Example are made of clad materials, but also in the case in which the test materials, Example, and Comparative Example are produced by the plating treatment according to the aforementioned second embodiment, it is believed that similar results can be obtained.

Modified Examples

The embodiments and examples disclosed this time must be considered as illustrative in all points and not restrictive. The scope of the present invention is not shown by the above description of the embodiments and examples but by the scope of claims for patent, and all modifications (modified examples) within the meaning and range equivalent to the scope of claims for patent are further included.

For example, while the example in which the negative electrode collector foil 205b that the Cu-coated foil 50 (250) (the foil for a negative electrode collector of a secondary battery) constitutes is applied to a lithium-ion secondary battery (battery 100) has been shown in each of the aforementioned first and second embodiments, the present invention is not restricted to this. According to the present invention, the negative electrode collector foil that the foil for a negative electrode collector of a secondary battery constitutes may be applied to a secondary battery other than a lithium-ion secondary battery. For example, the negative electrode collector foil may be applied to a sodium-ion secondary battery or a magnesium secondary battery.

While the example in which the Cu-coated foil 50 made of the clad material having a three-layer structure of a Cu layer, an iron-based alloy layer, and a Cu layer is used as the negative electrode collector foil 5b has been shown in the aforementioned first embodiment, and the example in which the Cu-coated foil 250 having a three-layer structure of a Cu-plated layer, an iron-based alloy layer, and a Cu-plated layer is used as the negative electrode collector foil 205b has been shown in the aforementioned second embodiment, the present invention is not restricted to this. According to the present invention, the negative electrode collector foil (Cu-coated foil) is not restricted to a three-layer structure. For example, a Ni layer that significantly reduces or prevents oxidation of the Cu layer (or the Cu-plated layer) may be formed on a surface of the Cu layer or the Cu-plated layer of the clad material opposite to the iron-based alloy layer. Furthermore, as described in the aforementioned second embodiment, a base layer (a Ni layer, for example) having a slight thickness may be disposed between the Cu-plated layer and the iron-based alloy layer. This base layer can also be applied to the Cu-coated foil made of the clad material. The thickness of the layer other than the Cu layer (or the Cu-plated layer) and the iron-based alloy layer is preferably sufficiently smaller than the thickness of each of the Cu layer (or the Cu-plated layer) and the iron-based alloy layer from the viewpoint of miniaturization of the secondary battery. In this case, the thickness of the negative electrode collector foil having a layer structure of four or more layers is preferably 20 µm or less.

While the example in which the Cu-coated intermediate material 150a (350a) is cold-rolled (room temperature) using the roller 102 to produce the Cu-coated material 150b (350b) having a first thickness of more than 20 µm and less than 100 µm has been shown in each of the aforementioned first and second embodiments, the present invention is not restricted to this. According to the present invention, the first thickness may be 100 µm or more. In this case, it is necessary to form a Cu-coated foil having a second thickness of 20 µm or less by further rolling a Cu-coated material having the first thickness, and thus the first thickness is preferably around 100 µm.

In the aforementioned second embodiment, after the plating treatment is performed on the iron-based alloy plate material 151, rolling can be performed so as to have a first thickness of more than 20 µm and less than 100 µm. Thereafter, annealing can be performed on the Cu-coated material 350b having a first thickness of more than 20 µm and less than 100 µm. Furthermore, while the example in which the Cu-coated material 350c after annealing is rolled to a thickness (second thickness) of 20 µm or less has been shown, the present invention is not restricted to this. According to the present invention, after the plating treatment is performed on the iron-based alloy plate material so as to have a first thickness of more than 20 µm and less than 100 µm, rolling may be directly performed so as to have a thickness of 20 µm or less (second thickness) without performing rolling and annealing.

While the example in which the pair of Cu-plated layers 252 and 253 are respectively formed on the opposite surfaces of the iron-based alloy layer 51 through the electroplating bath 301 has been shown in the aforementioned second embodiment, the present invention is not restricted to this. According to the present invention, the pair of Cu-plated layers may be respectively formed on the opposite surfaces of the iron-based alloy layer by electroless plating treatment.

While the example in which the Cu layers 52 and 53 (Cu-plated layers 252 and 253) are mainly made of Cu (copper) has been shown in each of the aforementioned first and second embodiments, the present invention is not restricted to this. According to the present invention, the Cu layers or the Cu-plated layers may be made of a Cu-based alloy that contains Cu as a main element, but also contains other elements. That is, the pair of Cu plate materials 152 and 153 may be made of a Cu-based alloy to produce the Cu layers 52 and 53, or the Cu plate materials 301a may be made of a Cu-based alloy to produce the Cu-plated layers 252 and 253.

DESCRIPTION OF REFERENCE NUMERALS

5a: negative electrode active material
5b, 205b: negative electrode collector foil (foil for a negative electrode collector of a secondary battery)
50, 250: Cu-coated foil
51: iron-based alloy layer
52, 53: Cu layer
150a, 350a: Cu-coated intermediate material
150b, 350b: Cu-coated material (first thickness)
150c, 350c: Cu-coated material (first thickness)
150d, 350d: Cu-coated foil (second thickness)
252, 253: Cu-plated layer (Cu layer)

The invention claimed is:

1. A foil (5b) for a negative electrode collector of a secondary battery, comprising:
a three layer-structure Cu-coated foil (50) including an iron-based alloy layer (51) made of precipitation hardened stainless steel, and a pair of Cu layers (52, 53) respectively disposed on opposite surfaces of the iron-based alloy layer and made of Cu or a Cu-based alloy,
the three layer-structure Cu-coated foil for the negative electrode collector of a secondary battery having a thickness of 20 µm or less, a volume resistivity of 5 µΩ·cm or less measured in compliance with JIS-C2525:1999 and an elastic limit stress $\sigma_{0.01}$ of 700 MPa or more,
wherein a metal element that constitutes the precipitation hardened stainless steel which is diffused into the pair of Cu layers exists as a precipitate in the pair of Cu layers.

2. The foil for a negative electrode collector of a secondary battery according to claim 1, wherein each of the pair of Cu layers is a Cu-plated layer (252, 253) made of the Cu or the Cu-based alloy.

3. The foil for a negative electrode collector of a secondary battery according to claim 1, made of a clad material in which the pair of Cu layers are respectively bonded onto the opposite surfaces of the iron-based alloy layer.

4. The foil for a negative electrode collector of a secondary battery according to claim 1, wherein the precipitation hardened stainless steel of which the iron-based alloy layer is made contains 15 mass % or more and 19 mass % or less of Cr, 6 mass % or more and 9 mass % or less of Ni, 0.5 mass % or more and 2.0 mass % or less of Al, 0.01 mass % or more and 0.3 mass % or less of C, 0.01 mass % or more and 0.3 mass % or less of N, a balance Fe, and inevitable impurities, some of the Cr, Ni, Al and Fe being diffused into the pair of Cu layers as the metal element.

5. A method for manufacturing a foil (5b) for a negative electrode collector of a secondary battery, wherein
Cu or a Cu-based alloy is disposed in layers on opposite surfaces of an iron-based alloy plate material made of precipitation hardened stainless steel such that a Cu-coated material (150*b*, 150*c*) including an iron-based alloy layer (51) made of the precipitation hardened stainless steel and a pair of Cu layers (52, 53) respectively disposed on opposite surfaces of the iron-based alloy layer and made of the Cu or the Cu-based alloy, the Cu-coated material having a first thickness of more than 20 μm is produced by annealing at a temperature of 850° C. or higher and 1050° C. or lower for a holding time of 0.3 minutes or more and 3 minutes or less and rolling; and the Cu-coated material is rolled to a second thickness of 20 μm or less, and thereafter aging treatment is performed at a temperature of 500° C. or higher and 650° C. or lower for a holding time of 0.5 minutes or more and 3 minutes or less such that a three layer-structure Cu-coated foil having a thickness of 20 μm or less, a volume resistivity of 5 μΩ·cm or less measured in compliance with JIS-C2525:1999, an elastic limit stress $\sigma_{0.01}$ of 700 MPa or more and a metal element constituting the precipitation hardened stainless steel which is diffused into the pair of Cu layers exists as a precipitate in the pair of Cu layers is obtained.

6. The method for manufacturing a foil for a negative electrode collector of a secondary battery according to claim 5, wherein the Cu-coated material having the first thickness is rolled to the second thickness under a condition of a rolling reduction of 70% or more.

7. The method for manufacturing a foil for a negative electrode collector of a secondary battery according to claim 5, wherein the opposite surfaces of the iron-based alloy plate material is plated with the Cu or the Cu-based alloy such that the Cu-coated material having the first thickness, in which the pair of Cu layers including Cu-plated layers (252, 253) made of the Cu or the Cu-based alloy are formed on the opposite surfaces of the iron-based alloy layer, is produced.

8. The method for manufacturing a foil for a negative electrode collector of a secondary battery according to claim 5, wherein a Cu-coated intermediate material (150*a*) in which a pair of Cu plate materials made of the Cu or the Cu-based alloy are bonded onto the opposite surfaces of the iron-based alloy plate material is produced, the Cu-coated intermediate material is rolled to the first thickness, and thereafter the annealing is performed such that the Cu-coated material made of a clad material and having the first thickness is produced.

* * * * *